United States Patent
Bernatchez

(10) Patent No.: US 12,269,351 B2
(45) Date of Patent: Apr. 8, 2025

(54) VEHICLE ACTIVATION SYSTEMS AND METHODS FOR ELECTRIC VEHICLES

(71) Applicant: TAIGA MOTORS INC., Lasalle (CA)

(72) Inventor: Gabriel Bernatchez, Lasalle (CA)

(73) Assignee: TAIGA MOTORS INC., Lasalle (CA)

( * ) Notice: Subject to any disclaimer, the term of this patent is extended or adjusted under 35 U.S.C. 154(b) by 0 days.

(21) Appl. No.: 18/414,833

(22) Filed: Jan. 17, 2024

(65) Prior Publication Data

US 2024/0190253 A1 Jun. 13, 2024

Related U.S. Application Data

(63) Continuation of application No. 18/107,112, filed on Feb. 8, 2023, now Pat. No. 11,912,140, which is a continuation of application No. 17/951,202, filed on Sep. 23, 2022, now Pat. No. 11,602,995, which is a continuation of application No. 17/865,752, filed on Jul. 15, 2022, now Pat. No. 11,498,426, which is a continuation of application No. 17/714,459, filed on Apr. 6, 2022, now Pat. No. 11,420,522.

(60) Provisional application No. 63/193,241, filed on May 26, 2021.

(51) Int. Cl.
*B60L 3/12* (2006.01)
*B60L 53/60* (2019.01)
*B62M 27/02* (2006.01)

(52) U.S. Cl.
CPC ............. *B60L 3/12* (2013.01); *B60L 53/60* (2019.02); *B62M 27/02* (2013.01); *B60L 2220/10* (2013.01)

(58) Field of Classification Search
CPC ........ B60L 3/12; B60L 53/60; B60L 2220/10; B62M 27/02
See application file for complete search history.

(56) References Cited

U.S. PATENT DOCUMENTS

| | | |
|---|---|---|
| 8,457,867 B2 | 6/2013 | Leblanc |
| 9,616,762 B2 | 4/2017 | Yamamoto |
| 9,718,366 B2 | 8/2017 | Matsuda |
| 9,908,577 B2 | 3/2018 | Novak et al. |

(Continued)

FOREIGN PATENT DOCUMENTS

WO 2021084520 A2 5/2021

OTHER PUBLICATIONS

Zero Motorcycles, Zero SR/F 2021 Owner's Manual, https://prismic-io.s3.amazonaws.com/zero-cms-disco/e9c73d95-18b6-41b0-8c61-5045b8014b11_OM-SRF-MY21.pdf, Accessed on Apr. 26, 2021, Pp. 4.7 to 4.10.

(Continued)

*Primary Examiner* — Alvaro E Fortich
(74) *Attorney, Agent, or Firm* — Norton Rose Fulbright Canada LLP

(57) ABSTRACT

Methods and systems for activating electric vehicles are provided. One method includes, in response to a first command to activate the vehicle, transitioning the vehicle from an inactive state to a wake state where a controller of the vehicle is activated and the vehicle is prevented from being propelled by an electric motor of the vehicle. The method also includes, in response to receiving a second command to activate the vehicle after receiving the first command, transitioning the vehicle from the wake state to a ready state where the vehicle is permitted to be propelled by the electric motor.

20 Claims, 15 Drawing Sheets

(56) References Cited

U.S. PATENT DOCUMENTS

| | | | |
|---|---|---|---|
| 11,420,522 B1 | 8/2022 | Bernatchez | |
| 11,498,426 B1 | 11/2022 | Bernatchez | |
| 11,602,995 B2 | 3/2023 | Bernatchez | |
| 2009/0079262 A1* | 3/2009 | Ohtomo | B60L 53/11 307/10.6 |
| 2010/0030412 A1* | 2/2010 | Mitsutani | F16H 61/12 701/22 |
| 2010/0222992 A1 | 9/2010 | Leblanc | |
| 2012/0059541 A1* | 3/2012 | Chiba | B60L 3/08 701/22 |
| 2014/0062408 A1* | 3/2014 | Sekino | B60L 53/14 320/118 |
| 2016/0068101 A1* | 3/2016 | Holloway | G10K 15/02 701/36 |
| 2016/0159237 A1* | 6/2016 | Morita | B60L 53/14 320/162 |
| 2016/0325725 A1* | 11/2016 | Yang | B60K 6/442 |
| 2019/0319472 A1 | 10/2019 | Lebreux | |
| 2020/0140037 A1 | 5/2020 | Haavikko et al. | |
| 2022/0009589 A1 | 1/2022 | Matsushita | |
| 2022/0017181 A1 | 1/2022 | Suzuki et al. | |
| 2022/0063764 A1 | 3/2022 | Matsushita | |
| 2022/0111929 A1 | 4/2022 | Matsushita | |

OTHER PUBLICATIONS

Alta Motors, Redshift MX MXR EX EXR SM Owner & Service Manual, https://drive.google.com/file/d/102Xmk45DGbWK8EdZ551vqVxdyUCKkjAGm/view, Accessed on Apr. 26, 2021, 2018, pp. 7-10.

Zero Motorcycles, Zero SR/S 2020 Owner's Manual, https://www.zeromotorcycles.com/owner-resources, 2020, pp. 4.7 to 4.11.

Alta Motors, 2017 Redshift Owner & Service Manual, https://www.manualslib.com/products/Alta-Motors-Redshift-Mx-2017-8820000.html, 2017, pp. 7-10.

European Patent Office, Communication re. extended European search report for European patent application No. 22166808.0-1012, Sep. 22, 2022.

European Patent Office, Communication pursuant to Article 94(3) re. European patent application No. 22166808.0, Aug. 10, 2023.

* cited by examiner

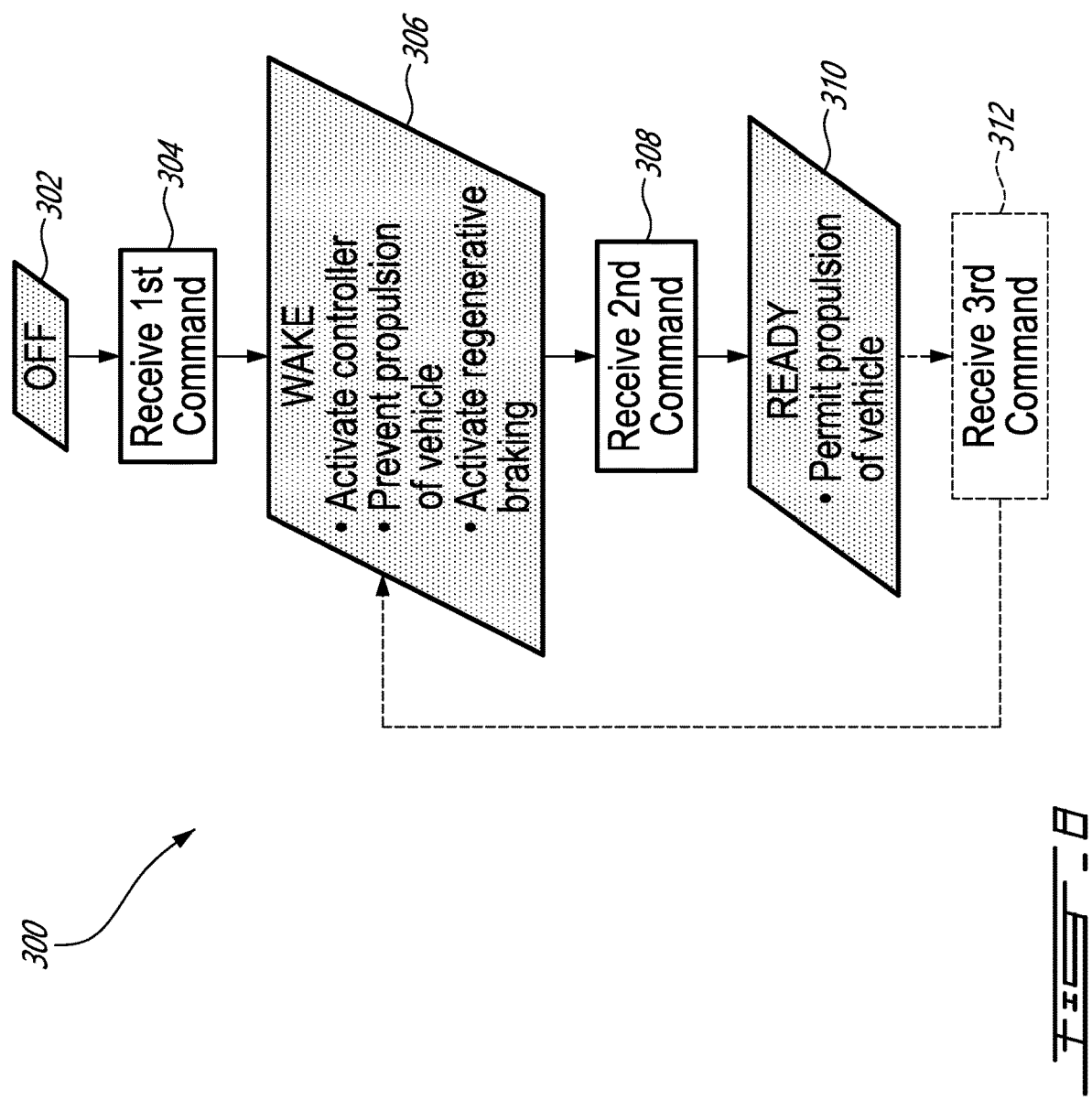

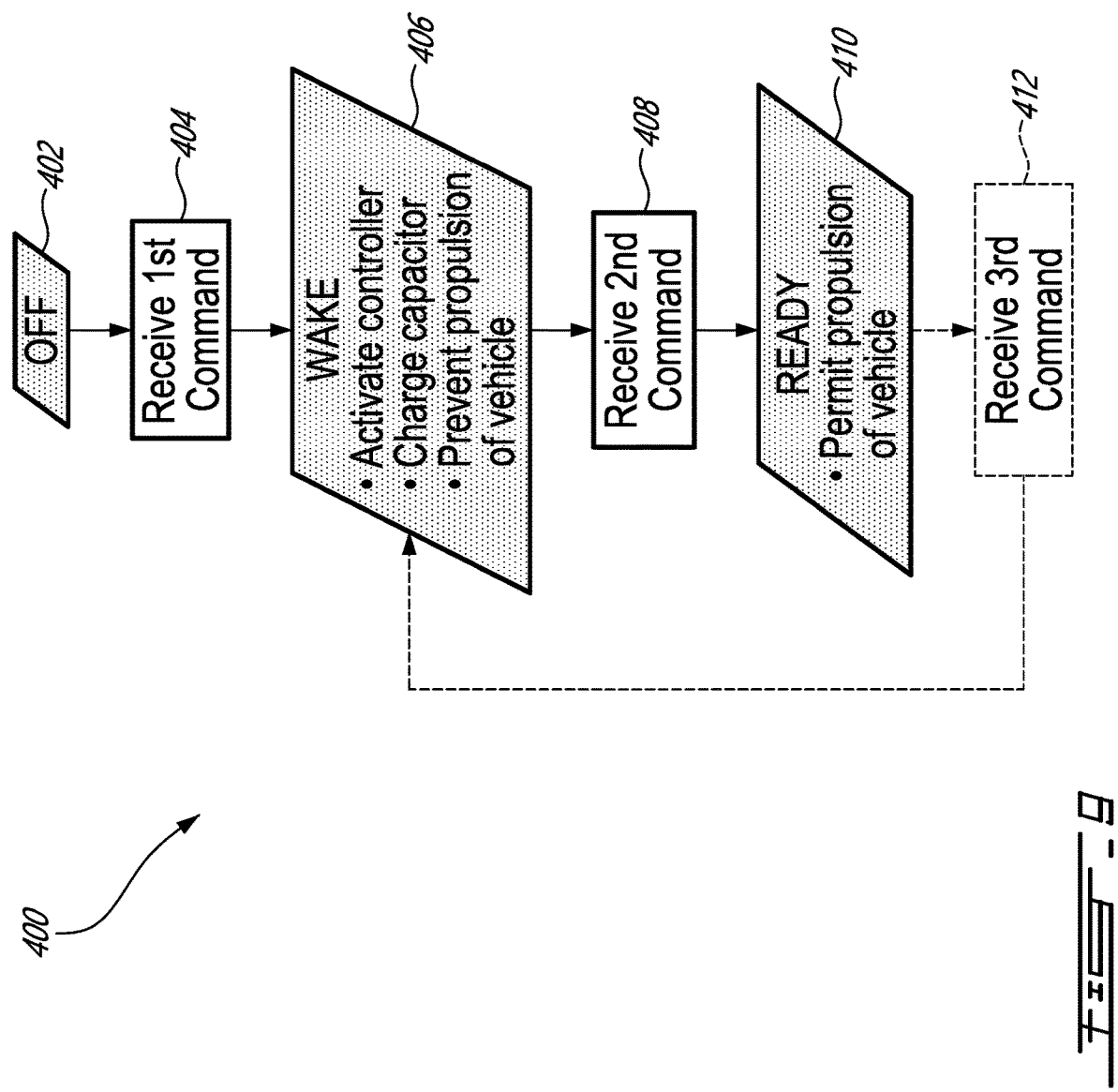

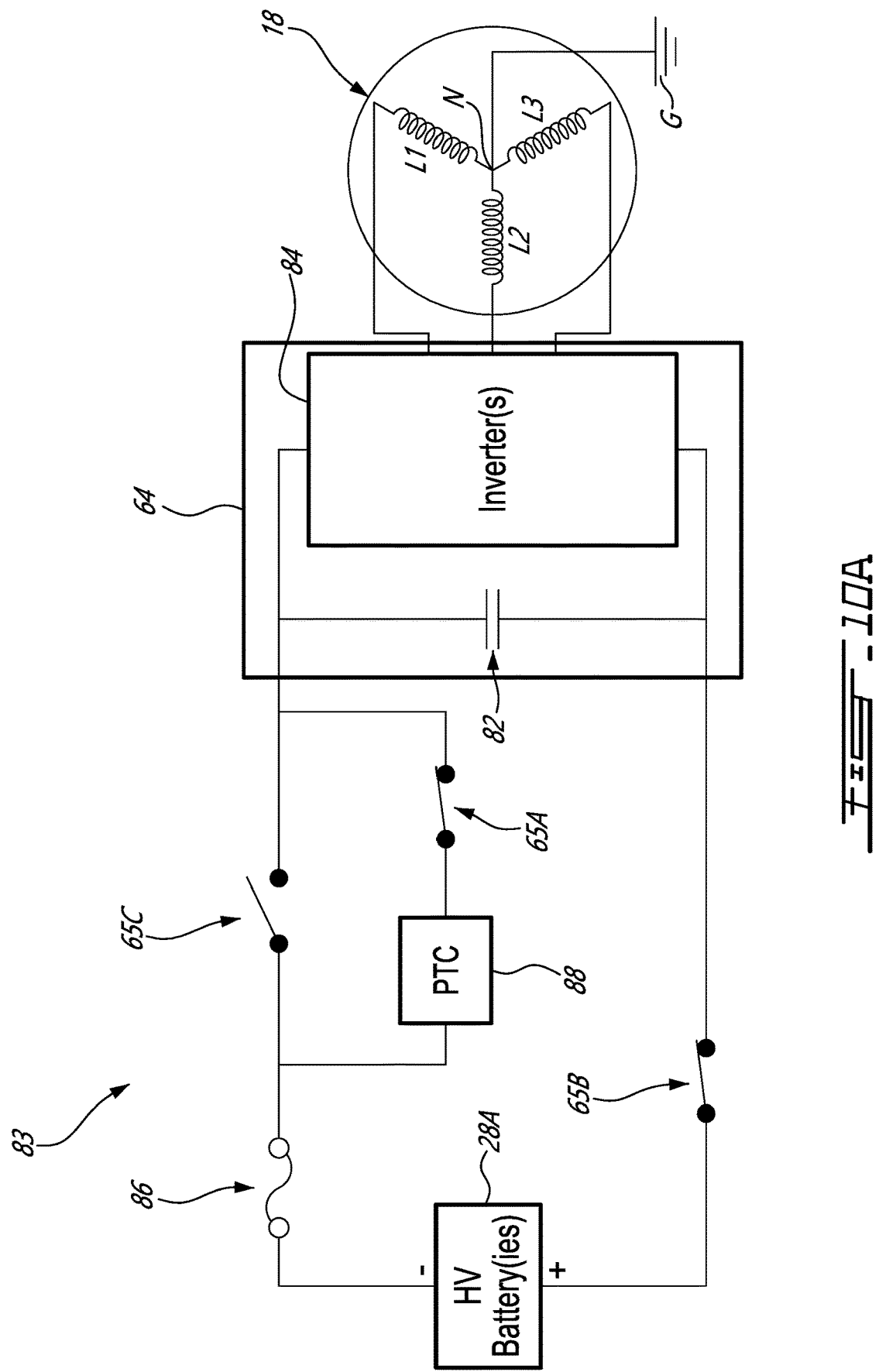

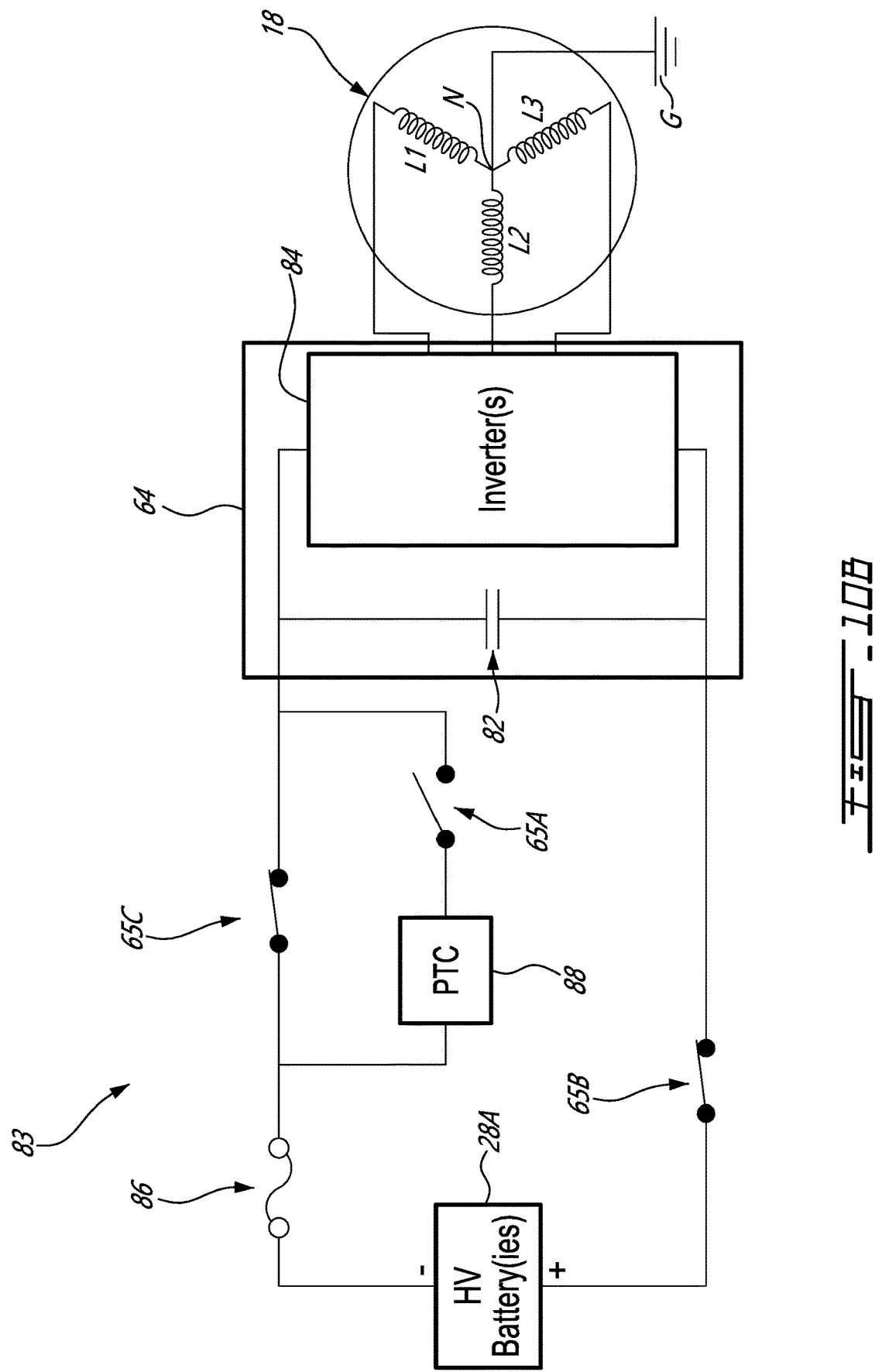

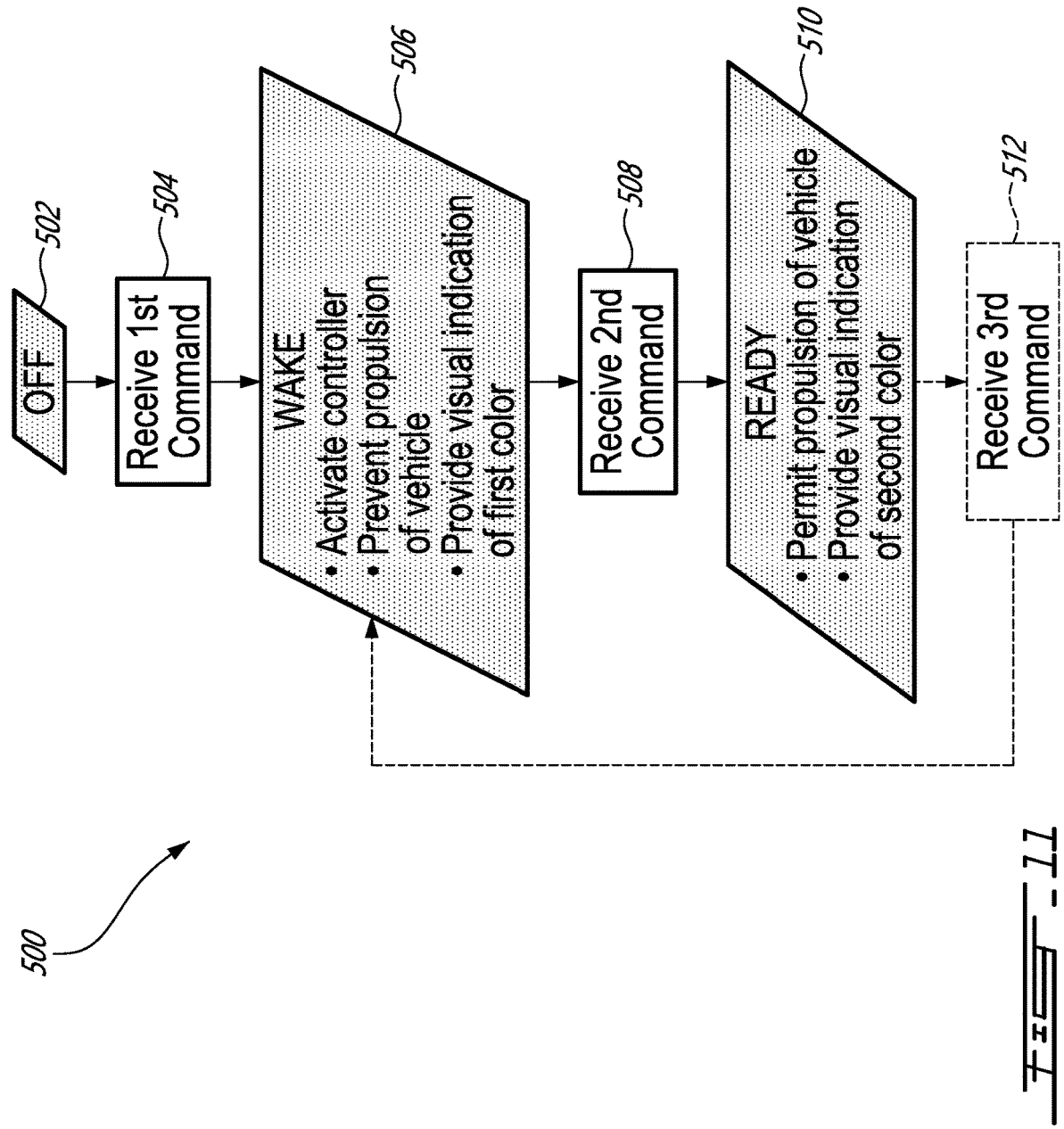

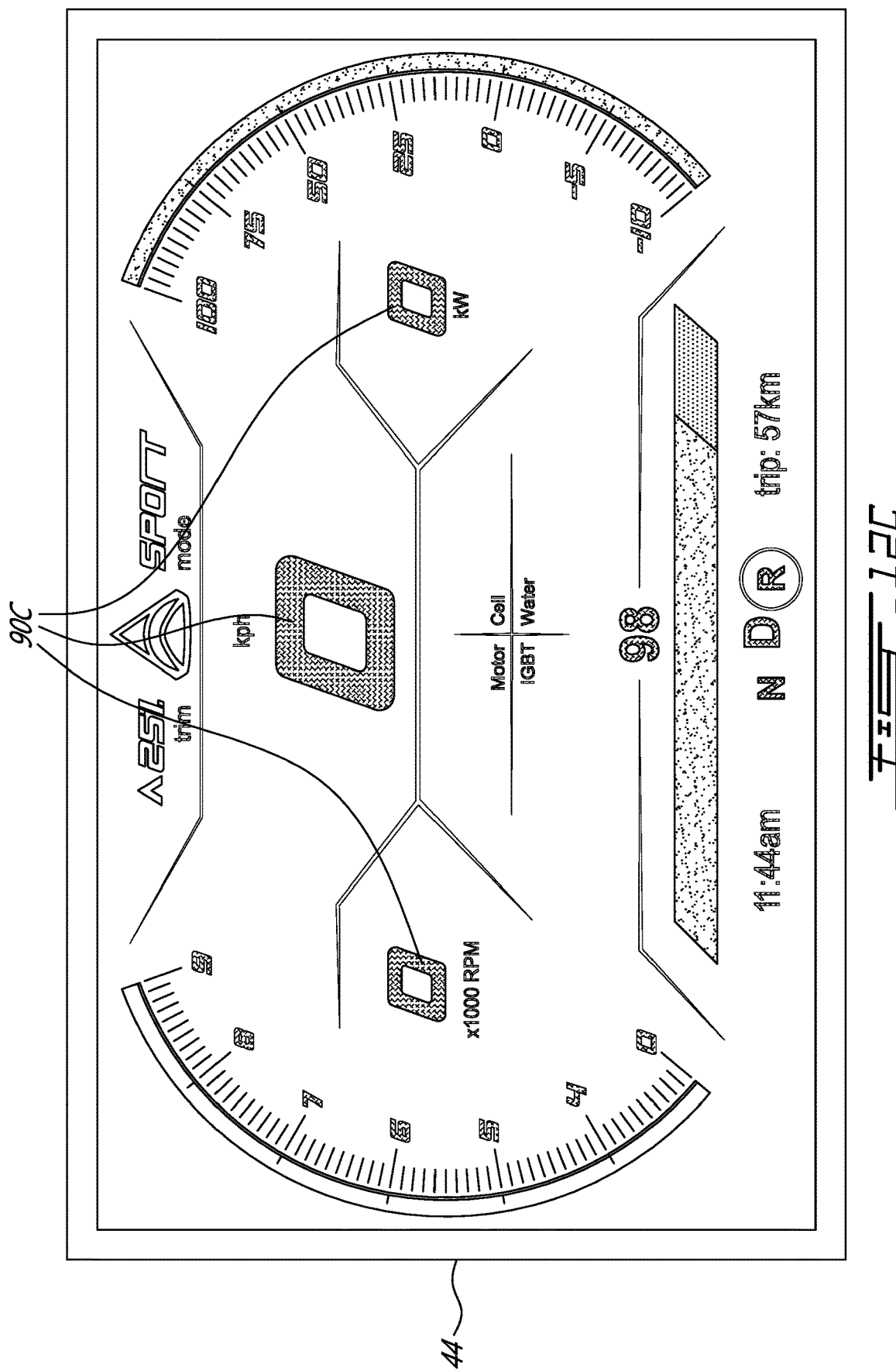

VEHICLE ACTIVATION SYSTEMS AND METHODS FOR ELECTRIC VEHICLES

CROSS-REFERENCE TO RELATED APPLICATION(S)

This application is a continuation of U.S. patent application Ser. No. 18/107,112 filed on Feb. 8, 2023 and incorporated herein by reference, which is a continuation of U.S. patent application Ser. No. 17/951,202 filed on Sep. 23, 2022, issued as U.S. Pat. No. 11,602,995 and incorporated herein by reference, which is a continuation of U.S. patent application Ser. No. 17/865,752 filed on Jul. 15, 2022, issued as U.S. Pat. No. 11,498,426 and incorporated herein by reference, which is a continuation of U.S. patent application Ser. No. 17/714,459 filed on Apr. 6, 2022, issued as U.S. Pat. No. 11,420,522 and incorporated herein by reference, which claims priority from U.S. Provisional Patent Application No. 63/193,241 filed May 26, 2021, which is incorporated by reference in its entirety herein.

TECHNICAL FIELD

The disclosure relates generally to electric vehicles, and more particularly to activating electric vehicles.

BACKGROUND

Vehicles that have an internal combustion engine are typically provided with an ignition switch or button that is used to activate a starter motor that in turn causes the engine to start. The operator can typically perceive that the engine has started and the vehicle is ready to be driven when the sound of the engine can be heard. Compared to vehicles with internal combustion engines, electric vehicles are typically more quiet and the lack of internal combustion engine sound can make the state of the electric vehicle less readily perceivable during start-up. Improvement is desirable.

SUMMARY

In one aspect, the disclosure describes a method of activating an electric vehicle. The method comprises:
when the electric vehicle is in an inactive state, receiving, via an operator input device disposed on the electric vehicle, a first command to activate the electric vehicle;
in response to the first command, transitioning the electric vehicle from the inactive state to a wake state where a controller of the electric vehicle is activated and the electric vehicle is prevented from being propelled by an electric motor configured to propel the electric vehicle;
after receiving the first command, receiving, via the operator input device, a second command to activate the electric vehicle when a shutoff switch of the electric vehicle is in a vehicle-on configuration; and
in response to the second command, transitioning the electric vehicle from the wake state to a ready state where the electric vehicle is permitted to be propelled by the electric motor.

The method may comprise, in response to the first command, providing a first visual indication of a first color indicating the wake state of the electric vehicle.

The method may comprise, in response to the second command, providing a second visual indication of a second color indicating the ready state of the electric vehicle.

The first and second visual indications may include an illumination of an instrument panel of the electric vehicle.

The method may comprise changing the second color of the second visual indication when transitioning the electric vehicle from a forward mode of operation to a reverse mode of operation.

Transitioning the electric vehicle from the inactive state to the wake state may include electrically connecting a battery to an inverter operatively connected to control a delivery of electric power from the battery to the electric motor.

Transitioning the electric vehicle from the inactive state to the wake state may include charging a capacitor electrically connected in parallel with the inverter.

The method may comprise:
after receiving the first command and before receiving the second command, receiving, via the operator input device, another command to activate the electric vehicle when the shutoff switch is in a vehicle-off configuration; and
in response to the other command, alerting an operator of the electric vehicle.

Alerting the operator may include producing an audible indication.

Transitioning the electric vehicle from the wake state to the ready state may be conditioned upon an operator's authorization to operate the electric vehicle having been received.

The method may comprise:
ignoring one or more first accelerator commands received via an accelerator of the electric vehicle when the electric vehicle is in the wake state; and
executing one or more second accelerator commands received via the accelerator when the electric vehicle is in the ready state.

The method may comprise:
after receiving the second command, receiving a third command from the operator input device; and
in response to the third command, transitioning the electric vehicle from the ready state to the wake state.

The operator input device may include a push button via which the first and second commands are received.

The method may comprise, when the electric vehicle is in the wake state and is in motion causing back-driving of the electric motor, causing regenerative braking of the electric motor.

Embodiments may include combinations of the above features.

In another aspect, the disclosure describes a computer program product for operating an electric vehicle, the computer program product comprising a non-transitory computer readable storage medium having program code embodied therewith, the program code readable/executable by a computer, processor or logic circuit to perform a method as described herein.

In another aspect, the disclosure describes a vehicle activation system for an electric vehicle. The vehicle activation system comprises:
an operator input device for receiving a first command and a second command to activate the electric vehicle;
a shutoff switch configurable between a vehicle-on configuration and a vehicle-off configuration;
one or more data processors operatively connected to the operator input device and to the shutoff switch; and
non-transitory machine-readable memory storing instructions executable by the one or more data processors and configured to cause the one or more data processors to:
in response to receiving the first command to activate the electric vehicle, cause the electric vehicle to be prevented from being propelled by an electric motor configured to propel the electric vehicle; and in response to receiving the second command to activate the electric vehicle after receiving the first command and when the shutoff switch is in the vehicle-on configuration, cause the electric vehicle to be permitted to be propelled by the electric motor.

The instructions may be configured to cause the one or more data processors to, in response to the first command, cause a first visual indication of a first color to be provided.

The instructions may be configured to cause the one or more data processors to, in response to the second command, cause a second visual indication of a second color different from the first color to be provided.

The first and second visual indications may include an illumination of an instrument panel of the electric vehicle.

The instructions may be configured to cause the one or more data processors to cause the second color of the second visual indication to be changed when the electric vehicle is transitioned from a forward mode of operation to a reverse mode of operation.

The instructions may be configured to cause the one or more data processors to, in response to the first command, cause a battery of the electric vehicle to be electrically connected to a power electronics module configured to control a delivery of electric power from the battery to the electric motor.

The instructions may be configured to cause the one or more data processors to, in response to the first command, cause charging of a capacitor of the power electronics module.

The instructions may be configured to cause the one or more data processors to cause an alert to be generated in response to another command to activate the electric vehicle being received after receiving the first command, before receiving the second command and when the shutoff switch of the electric vehicle is in the vehicle-off configuration.

The alert may include an audible indication.

The second command may be configured to cause the electric vehicle to be permitted to be propelled by the electric motor conditioned upon an operator's authorization to operate the electric vehicle being received.

The instructions may be configured to cause the one or more data processors to, in response to receiving a third command via the operator input device after receiving the second command, cause the electric vehicle to be prevented from being propelled by the electric motor.

The operator input device may include a push button via which the first and second commands are received.

The instructions may be configured to cause the one or more data processors to, after receiving the first command, before receiving the second command, and when the electric vehicle is in motion causing back-driving of the electric motor, cause regenerative braking of the electric motor.

Embodiments may include combinations of the above features.

In another aspect, the disclosure describes an electric powersport vehicle comprising a vehicle activation system as described herein.

In another aspect, the disclosure describes an electric snowmobile comprising a vehicle activation system as described herein.

In another aspect, the disclosure describes an electric powersport vehicle comprising:

an electric motor configured to propel the electric powersport vehicle;

an operator input device for receiving a first command and a second command to activate the electric powersport vehicle;

a shutoff switch configurable between a vehicle-on configuration and a vehicle-off configuration; and a controller operatively connected to the electric motor, to the operator input device, and to the shutoff switch, the controller being configured to:

in response to the first command to activate the electric powersport vehicle being received via the operator input device, cause the electric powersport vehicle to be prevented from being propelled by the electric motor; and in response to the second command to activate the electric powersport vehicle being received via the operator input device after receiving the first command and when the shutoff switch is in the vehicle-on configuration, cause the electric powersport vehicle to be permitted to be propelled by the electric motor.

The controller may be configured to, in response to the first command, cause a visual indication to be provided.

The controller may be configured to, in response to the second command, cause a color of the visual indication to be changed.

The visual indication may include an illumination of an instrument panel of the electric powersport vehicle.

The controller may be configured to:

cause the visual indication to have a first color when the electric powersport vehicle is in a forward mode of operation; and cause the visual indication to have a second color different from the first color when the electric powersport vehicle is in a reverse mode of operation.

The controller may be configured to, in response to the first command, cause a battery of the electric powersport vehicle to be electrically connected to a power electronics module configured to control a delivery of electric power from the battery to the electric motor.

The controller may be configured to, in response to the first command, cause charging of a capacitor of the power electronics module.

The controller may be configured to cause an alert to be generated in response to another command to activate the electric powersport vehicle being received after receiving the first command, before receiving the second command and when the shutoff switch of the electric powersport vehicle is in the vehicle-off configuration.

The alert may include an audible indication.

The second command may be configured to cause the electric powersport vehicle to be permitted to be propelled by the electric motor conditioned upon an operator's authorization to operate the electric powersport vehicle being received.

The controller may be configured to, in response to receiving a third command via the operator input device after receiving the second command, cause the electric powersport vehicle to be prevented from being propelled by the electric motor.

The operator input device may include a push button via which the first and second commands are received.

The push button may be disposed at a location other than on a handlebar of the electric powersport vehicle.

The controller may be configured to, after receiving the first command, before receiving the second command, and when the electric powersport vehicle is in motion causing back-driving of the electric motor, cause regenerative braking of the electric motor.

Embodiments may include combinations of the above features.

In another aspect, the disclosure describes a method of activating an electric powersport vehicle. The method comprises:
- when the electric powersport vehicle is in an inactive state, receiving, via a push button disposed on the electric powersport vehicle, a first command to activate the electric powersport vehicle;
- in response to the first command, transitioning the electric powersport vehicle from the inactive state to a wake state where a controller of the electric powersport vehicle is activated and the electric powersport vehicle is prevented from being propelled by an electric motor configured to propel the electric powersport vehicle;
- after receiving the first command, receiving, via the push button, a second command to activate the electric powersport vehicle; and
- in response to the second command, transitioning the electric powersport vehicle from the wake state to a ready state where the electric powersport vehicle is permitted to be propelled by the electric motor.

The method may comprise, in response to the first command, providing a first visual indication of a first color indicating the wake state of the electric powersport vehicle.

The method may comprise, in response to the second command, providing a second visual indication of a second color indicating the ready state of the electric powersport vehicle.

The first and second visual indications may include an illumination of an instrument panel of the electric powersport vehicle.

The method may comprise changing the second color of the second visual indication when transitioning the electric powersport vehicle from a forward mode of operation to a reverse mode of operation.

Transitioning the electric powersport vehicle from the inactive state to the wake state may include electrically connecting a battery to an inverter operatively connected to control a delivery of electric power from the battery to the electric motor.

Transitioning the electric powersport vehicle from the inactive state to the wake state may include charging a capacitor electrically connected in parallel with the inverter.

Transitioning the electric powersport vehicle from the wake state to the ready state may be conditioned upon an operator's authorization to operate the electric powersport vehicle having been received.

The method may comprise: after receiving the second command, receiving a third command from the push button; and in response to the third command, transitioning the electric powersport vehicle from the ready state to the wake state.

The method may comprise, when the electric powersport vehicle is in the wake state and is in motion causing back-driving of the electric motor, causing regenerative braking of the electric motor.

Embodiments may include combinations of the above features.

In another aspect, the disclosure describes an electric powersport vehicle comprising:
- an electric motor configured to propel the electric powersport vehicle;
- a push button for receiving a first command and a second command to activate the electric powersport vehicle; and
- a controller operatively connected to the electric motor and to the push button, the controller being configured to:
- in response to the first command to activate the electric powersport vehicle being received via the push button, cause the electric powersport vehicle to be prevented from being propelled by the electric motor; and
- in response to the second command to activate the electric powersport vehicle being received via the push button after receiving the first command, cause the electric powersport vehicle to be permitted to be propelled by the electric motor.

The controller may be configured to, in response to the first command, cause a first visual indication of a first color to be provided.

The controller may be configured to, in response to the second command, cause a second visual indication of a second color different from the first color to be provided.

The first and second visual indications may include an illumination of an instrument panel of the electric powersport vehicle.

The controller may be configured to cause the second color of the second visual indication to be changed when the electric powersport vehicle is transitioned from a forward mode of operation to a reverse mode of operation.

The controller may be configured to, in response to the first command, cause a battery of the electric powersport vehicle to be electrically connected to a power electronics module configured to control a delivery of electric power from the battery to the electric motor.

The controller may be configured to, in response to the first command, cause charging of a capacitor of the power electronics module.

The second command may be configured to cause the electric powersport vehicle to be permitted to be propelled by the electric motor conditioned upon an operator's authorization to operate the electric powersport vehicle being received.

The controller may be configured to, in response to receiving a third command via the push button after receiving the second command, cause the electric powersport vehicle to be prevented from being propelled by the electric motor.

The controller may be configured to, after receiving the first command, before receiving the second command, and when the electric powersport vehicle is in motion causing back-driving of the electric motor, cause regenerative braking of the electric motor.

The push button may be disposed at a location other than on a handlebar of the electric powersport vehicle.

The electric powersport vehicle may be a snowmobile.

Embodiments may include combinations of the above features.

In another aspect, the disclosure describes a method of activating an electric vehicle including an electric motor configured to propel the electric vehicle using electric power from a battery. The method comprises:
- when the electric vehicle is in an inactive state, receiving, via an operator input device disposed on the electric vehicle, a first command to activate the electric vehicle;
- in response to the first command, transitioning the electric vehicle from the inactive state to a wake state where:
- a controller of the electric vehicle is activated;
- a capacitor of a power electronics module operatively disposed between the battery and the electric motor is charged; and the electric vehicle is prevented from being propelled by the electric motor;

after receiving the first command, receiving, via the operator input device, a second command to activate the electric vehicle; and in response to the second command, transitioning the electric vehicle from the wake state to a ready state where the electric vehicle is permitted to be propelled by the electric motor.

The method may comprise, in response to the first command, providing a first visual indication of a first color indicating the wake state of the electric vehicle.

The method may comprise, in response to the second command, providing a second visual indication of a second color indicating the ready state of the electric vehicle.

The first and second visual indications may include an illumination of an instrument panel of the electric vehicle.

The method may comprise changing the second color of the second visual indication when transitioning the electric vehicle from a forward mode of operation to a reverse mode of operation.

Transitioning the electric vehicle from the wake state to the ready state may be conditioned upon an operator's authorization to operate the electric vehicle having been received.

The method may comprise: after receiving the second command, receiving a third command from the operator input device; and in response to the third command, transitioning the electric vehicle from the ready state to the wake state.

The method may comprise, when the electric vehicle is in the wake state and is in motion causing back-driving of the electric motor, causing regenerative braking of the electric motor.

Embodiments may include combinations of the above features.

In another aspect, the disclosure describes a vehicle activation system for an electric vehicle. The vehicle activation system comprises:

an operator input device for receiving a first command and a second command to activate the electric vehicle;

one or more data processors operatively connected to the operator input device; and non-transitory machine-readable memory storing instructions executable by the one or more data processors and configured to cause the one or more data processors to:

in response to receiving the first command to activate the electric vehicle:

cause a capacitor of a power electronics module operatively disposed between a battery and an electric motor configured to propel the electric vehicle to be charged; and cause the electric vehicle to be prevented from being propelled by the electric motor; and in response to receiving the second command to activate the electric vehicle after receiving the first command, cause the electric vehicle to be permitted to be propelled by the electric motor.

The instructions may be configured to cause the one or more data processors to, in response to the first command, cause a first visual indication of a first color to be provided.

The instructions may be configured to cause the one or more data processors to, in response to the second command, cause a second visual indication of a second color different from the first color to be provided.

The first and second visual indications may include an illumination of an instrument panel of the electric vehicle.

The instructions may be configured to cause the one or more data processors to cause the second color of the second visual indication to be changed when the electric vehicle is transitioned from a forward mode of operation to a reverse mode of operation.

The second command may be configured to cause the electric vehicle to be permitted to be propelled by the electric motor conditioned upon an operator's authorization to operate the electric vehicle being received.

The instructions may be configured to cause the one or more data processors to, in response to receiving a third command via the operator input device after receiving the second command, cause the electric vehicle to be prevented from being propelled by the electric motor.

The instructions may be configured to cause the one or more data processors to, after receiving the first command, before receiving the second command, and when the electric vehicle is in motion causing back-driving of the electric motor, cause regenerative braking of the electric motor.

Embodiments may include combinations of the above features.

In another aspect, the disclosure describes an electric powersport vehicle comprising:

an electric motor configured to propel the electric powersport vehicle;

a battery for supplying electric power to the electric motor;

a power electronics module operatively connected between the battery and the electric motor;

an operator input device for receiving a first command and a second command to activate the electric powersport vehicle; and a controller operatively connected to the operator input device and to the power electronics module, the controller being configured to:

in response to the first command to activate the electric powersport vehicle being received via the operator input device when the electric powersport vehicle is in an inactive state:

cause a capacitor of the power electronics module to be charged; and cause the electric powersport vehicle to be prevented from being propelled by the electric motor; and in response to the second command to activate the electric powersport vehicle being received via the operator input device after receiving the first command, cause the electric powersport vehicle to be permitted to be propelled by the electric motor.

The controller may be configured to, in response to the first command, cause a first visual indication of a first color to be provided.

The controller may be configured to, in response to the second command, cause a second visual indication of a second color different from the first color to be provided.

The first and second visual indications may include an illumination of an instrument panel of the electric powersport vehicle.

The controller may be configured to cause the second color of the second visual indication to be changed when the electric powersport vehicle is transitioned from a forward mode of operation to a reverse mode of operation.

The second command may be configured to cause the electric powersport vehicle to be permitted to be propelled by the electric motor conditioned upon an operator's authorization to operate the electric powersport vehicle being received.

The controller may be configured to, in response to receiving a third command via the operator input device after receiving the second command, cause the electric powersport vehicle to be prevented from being propelled by the electric motor.

The controller may be configured to, after receiving the first command, before receiving the second command, and when the electric powersport vehicle is in motion causing back-driving of the electric motor, cause regenerative braking of the electric motor.

The operator input device may be disposed at a location other than on a handlebar of the electric powersport vehicle.

Embodiments may include combinations of the above features.

In another aspect, the disclosure describes a method of activating an electric vehicle. The method comprises:
  when the electric vehicle is in an inactive state, receiving a first command to activate the electric vehicle;
  in response to the first command, transitioning the electric vehicle from the inactive state to a wake state where:
    a controller of the electric vehicle is activated;
    the electric vehicle is prevented from being propelled by an electric motor configured to propel the electric vehicle; and
    regenerative braking of the electric motor is caused when the electric vehicle is in motion causing back-driving of the electric motor;
  after receiving the first command, receiving a second command to activate the electric vehicle; and
  in response to the second command, transitioning the electric vehicle from the wake state to a ready state where the electric vehicle is permitted to be propelled by the electric motor.

The method may comprise, in response to the first command, providing a first visual indication of a first color indicating the wake state of the electric vehicle.

The method may comprise, in response to the second command, providing a second visual indication of a second color indicating the ready state of the electric vehicle.

The first and second visual indications may include an illumination of an instrument panel of the electric vehicle.

The method may comprise changing the second color of the second visual indication when transitioning the electric vehicle from a forward mode of operation to a reverse mode of operation.

Transitioning the electric vehicle from the wake state to the ready state may be conditioned upon an operator's authorization to operate the electric vehicle having been received.

The method may comprise:
  after receiving the second command, receiving a third command; and
  in response to the third command, transitioning the electric vehicle from the ready state to the wake state.

Embodiments may include combinations of the above features.

In another aspect, the disclosure describes a vehicle activation system for an electric vehicle. The vehicle activation system comprises:
  an operator interface for receiving a first command and a second command to activate the electric vehicle;
  one or more data processors operatively connected to the operator interface; and
  non-transitory machine-readable memory storing instructions executable by the one or more data processors and configured to cause the one or more data processors to:
    in response to receiving the first command to activate the electric vehicle when the electric vehicle is in an inactive state:
      cause the electric vehicle to be prevented from being propelled by an electric motor configured to propel the electric vehicle; and
      cause regenerative braking of the electric motor when the electric vehicle is in motion causing back-driving of the electric motor; and
    in response to receiving the second command to activate the electric vehicle after receiving the first command, cause the electric vehicle to be permitted to be propelled by the electric motor.

The instructions may be configured to cause the one or more data processors to, in response to the first command, cause a first visual indication of a first color to be provided.

The instructions may be configured to cause the one or more data processors to, in response to the second command, cause a second visual indication of a second color different from the first color to be provided.

The first and second visual indications may include an illumination of an instrument panel of the electric vehicle.

The instructions may be configured to cause the one or more data processors to cause the second color of the second visual indication to be changed when the electric vehicle is transitioned from a forward mode of operation to a reverse mode of operation.

The second command may be configured to cause the electric vehicle to be permitted to be propelled by the electric motor conditioned upon an operator's authorization to operate the electric vehicle being received.

The instructions may be configured to cause the one or more data processors to, in response to receiving a third command via the operator interface after receiving the second command, cause the electric vehicle to be prevented from being propelled by the electric motor.

Embodiments may include combinations of the above features.

In one aspect, the disclosure describes an electric powersport vehicle comprising:
  an electric motor configured to propel the electric powersport vehicle;
  an operator interface for receiving a first command and a second command to activate the electric powersport vehicle; and
  a controller operatively connected to the operator interface, the controller being configured to:
    in response to the first command to activate the electric powersport vehicle being received via the operator interface:
      cause the electric powersport vehicle to be prevented from being propelled by the electric motor; and
      cause regenerative braking of the electric motor when the electric powersport vehicle is in motion causing back-driving of the electric motor; and
    in response to the second command to activate the electric powersport vehicle being received via the operator interface after receiving the first command, cause the electric powersport vehicle to be permitted to be propelled by the electric motor.

The controller may be configured to, in response to the first command, cause a first visual indication of a first color to be provided.

The controller may be configured to, in response to the second command, cause a second visual indication of a second color different from the first color to be provided.

The first and second visual indications may include an illumination of an instrument panel of the electric powersport vehicle.

The controller may be configured to cause the second color of the second visual indication to be changed when the electric powersport vehicle is transitioned from a forward mode of operation to a reverse mode of operation.

The second command may be configured to cause the electric powersport vehicle to be permitted to be propelled by the electric motor conditioned upon an operator's authorization to operate the electric powersport vehicle being received.

The controller may be configured to, in response to receiving a third command via the operator interface after receiving the second command, cause the electric powersport vehicle to be prevented from being propelled by the electric motor.

Embodiments may include combinations of the above features.

In another aspect, the disclosure describes a method of activating an electric vehicle. The method comprises:
  when the electric vehicle is in an inactive state, receiving a first command to activate the electric vehicle;
  in response to the first command, transitioning the electric vehicle from the inactive state to a wake state where:
  a controller of the electric vehicle is activated;
  the electric vehicle is prevented from being propelled by an electric motor configured to propel the electric vehicle; and
  a first visual indication of a first color is provided to indicate the wake state of the electric vehicle;
  after receiving the first command, receiving a second command to activate the electric vehicle; and
  in response to the second command, transitioning the electric vehicle from the wake state to a ready state where:
  the electric vehicle is permitted to be propelled by the electric motor; and
  a second visual indication of a second color different from the first color is provided to indicate the ready state of the electric vehicle.

The first and second visual indications may include an illumination of an instrument panel of the electric vehicle.

The method may comprise changing the second color of the second visual indication when transitioning the electric vehicle from a forward mode of operation to a reverse mode of operation.

Transitioning the electric vehicle from the wake state to the ready state may be conditioned upon an operator's authorization to operate the electric vehicle having been received.

The method may comprise: after receiving the second command, receiving a third command; and in response to the third command, transitioning the electric vehicle from the ready state to the wake state.

Embodiments may include combinations of the above features.

In another aspect, the disclosure describes a vehicle activation system for an electric vehicle. The vehicle activation system comprises:
  an operator interface for receiving a first command and a second command to activate the electric vehicle;
  one or more data processors operatively connected to the operator interface; and
  non-transitory machine-readable memory storing instructions executable by the one or more data processors and configured to cause the one or more data processors to:
  in response to receiving the first command to activate the electric vehicle when the electric vehicle is in an inactive state:
  cause the electric vehicle to be prevented from being propelled by an electric motor of the electric vehicle; and
  cause a first visual indication of a first color to be provided;
  in response to receiving the second command to activate the electric vehicle after receiving the first command:
  cause the electric vehicle to be permitted to be propelled by the electric motor; and
  cause a second visual indication of a second color different from the first color to be provided.

The first and second visual indications may include an illumination of an instrument panel of the electric vehicle.

The instructions may be configured to cause the one or more data processors to, change the second color of the second visual indication when the electric vehicle is transitioned from a forward mode of operation to a reverse mode of operation.

The second command may be configured to cause the electric vehicle to be permitted to be propelled by the electric motor conditioned upon an operator's authorization to operate the electric vehicle being received.

The instructions may be configured to cause the one or more data processors to, in response to receiving a third command via the operator interface after receiving the second command, cause the electric vehicle to be prevented from being propelled by the electric motor.

Embodiments may include combinations of the above features.

In one aspect, the disclosure describes an electric powersport vehicle comprising:
  an electric motor configured to propel the electric powersport vehicle;
  an operator interface for receiving a first command and a second command to activate the electric powersport vehicle; and
  a controller operatively connected to the operator interface, the controller being configured to:
  in response to receiving the first command to activate the electric powersport vehicle when the electric powersport vehicle is in an inactive state:
  cause the electric powersport vehicle to be prevented from being propelled by the electric motor; and
  cause a first visual indication of a first color to be provided;
  in response to receiving the second command to activate the electric powersport vehicle after receiving the first command:
  cause the electric powersport vehicle to be permitted to be propelled by the electric motor; and
  cause a second visual indication of a second color different from the first color to be provided.

The first and second visual indications may include an illumination of an instrument panel of the electric powersport vehicle.

The controller may be configured to cause the second color of the second visual indication to be changed when the electric powersport vehicle is transitioned from a forward mode of operation to a reverse mode of operation.

The second command may be configured to cause the electric powersport vehicle to be permitted to be propelled by the electric motor conditioned upon an operator's authorization to operate the electric powersport vehicle being received.

The controller may be configured to, in response to receiving a third command via the operator interface after receiving the second command, cause the electric powersport vehicle to be prevented from being propelled by the electric motor.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 8 shows a flow diagram of another exemplary method of activating an electric vehicle;

FIG. 9 shows a flow diagram of another exemplary method of activating an electric vehicle;

FIGS. 10A and 10B show different configurations of an exemplary circuit for activating an electric vehicle;

FIG. 11 shows a flow diagram of another exemplary method of activating an electric vehicle; and FIGS. 12A-12C show exemplary graphic representations displayed on an instrument panel of the electric vehicle of FIG. 1 providing visual indications of different colors.

DETAILED DESCRIPTION

The following disclosure relates to systems and associated methods for activating electric vehicles. In some embodiments, the systems and methods described herein may be particularly suitable for electric powersport vehicles. Examples of suitable electric powersport vehicles include snowmobiles, motorcycles, personal watercraft (PWCs), all-terrain vehicles (ATVs), and (e.g., side-by-side) utility task vehicles (UTVs). In some embodiments, the systems and methods described herein may provide a relatively user-friendly activation sequence. In some embodiments, the systems and methods described herein may promote the operator's awareness of the state of the electric vehicle. In some embodiments, the systems and methods described herein may promote a safe operation of an electric vehicle by reducing a risk of the electric vehicle being inadvertently placed in a ready state and/or being inadvertently caused to be propelled.

The terms "connected" and "coupled" may include both direct connection and coupling (where two elements contact each other) and indirect connection and coupling (where at least one additional element is located between the two elements).

The term "substantially" as used herein may be applied to modify any quantitative representation which could permissibly vary without resulting in a change in the basic function to which it is related.

Aspects of various embodiments are described through reference to the drawings.

Figure 1:
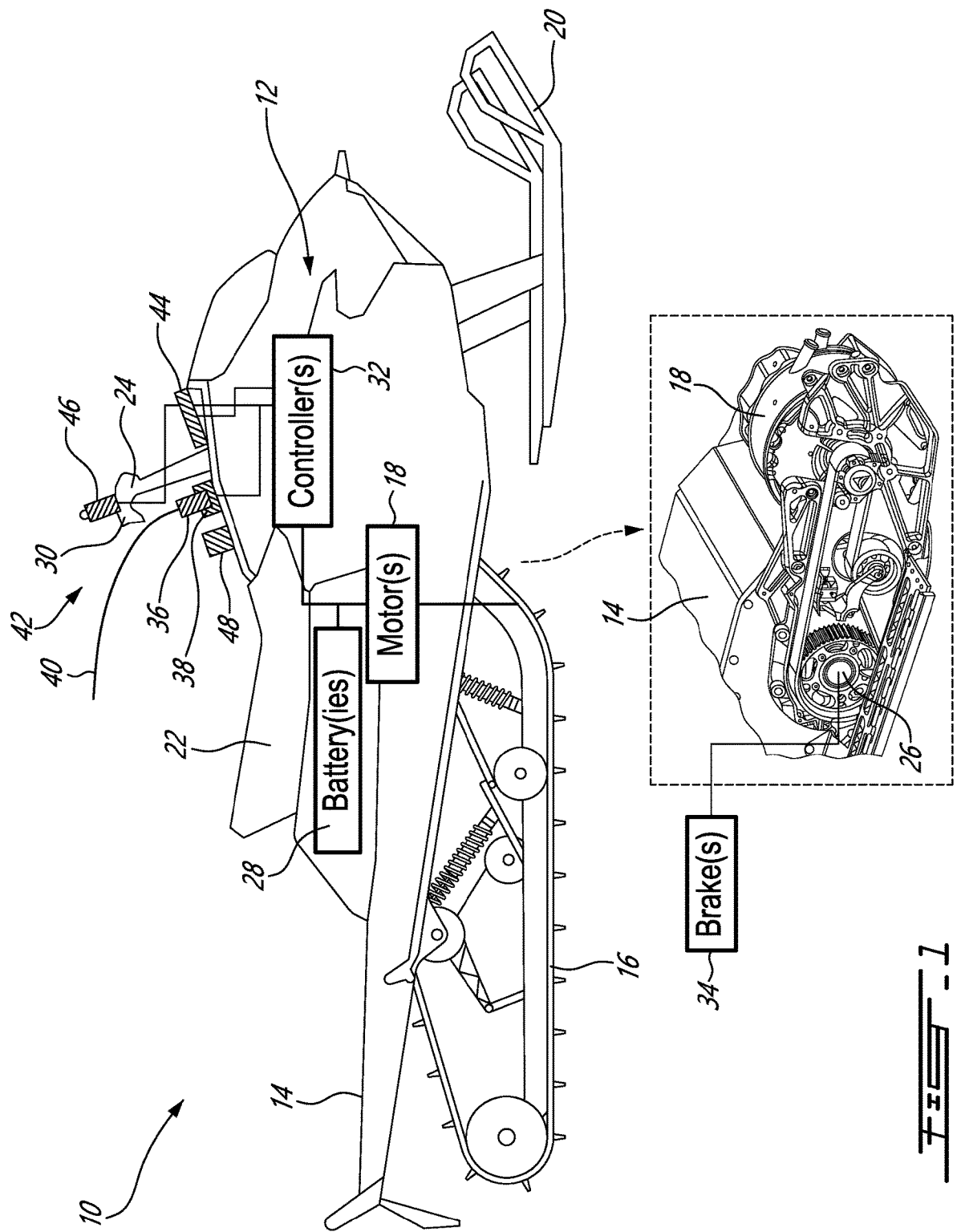
FIG. 1 is a schematic representation of an exemplary electric vehicle including a vehicle activation system as described herein.

FIG. 1 is a schematic representation of an exemplary electric powersport vehicle 10 (referred hereinafter as "vehicle 10") including vehicle activation system 12 (referred hereinafter as "system 12") as described herein. As illustrated in FIG. 1, vehicle 10 may be a snowmobile but it is understood that the systems described herein may also be used on other types of electric vehicles such as electric UTVs, electric ATVs, electric PWCs, electric motorcycles, and other electric powersport vehicles. In some embodiments, vehicle 10 may be an electric snowmobile including elements of the snow vehicle described in International Patent Application no. WO 2019/049109 A1 (Title: Battery arrangement for electric snow vehicles), and U.S. Patent Application No. 63/135,497 (Title: Electric vehicle with battery pack as structural element) which are incorporated herein by reference.

Vehicle 10 may include a frame (also known as a chassis) which may include tunnel 14, track 16 having the form of an endless belt for engaging the ground and disposed under tunnel 14, one or more electric motors 18 (referred hereinafter in the singular) mounted to the frame and configured to drive track 16, left and right skis 20 disposed in a front portion of vehicle 10, straddle seat 22 disposed above tunnel 14 for accommodating an operator of vehicle 10 and optionally one or more passengers (not shown). Skis 20 may be movably attached to the frame to permit steering of vehicle 10 via a steering assembly including a steering column interconnecting handlebar 24 with skis 20.

Motor 18 may be drivingly coupled to track 16 via drive shaft 26 shown in the inset of FIG. 1. Electric motor 18 may be in torque-transmitting engagement with drive shaft 26 via a belt/pulley drive. However, motor 18 may be in torque-transmitting engagement with drive shaft 26 via other arrangements such as a chain/sprocket drive, or shaft/gear drive for example. Drive shaft 26 may be drivingly coupled to track 16 via one or more toothed wheels or other means so as to transfer motive power from motor 18 to track 16.

Vehicle 10 may also include one or more batteries 28 (referred hereinafter in the singular) for providing electric power to motor 18 and driving motor 18. Battery 28 may be disposed under seat 22. The operation of motor 18 and the delivery of electric power to motor 18 may be controlled by controller 32 based on an actuation of accelerator 30, also referred to as "throttle", by the operator. In some embodiments, battery 28 may be a lithium ion or other type of battery. In various embodiments, motor 18 may be a permanent magnet synchronous motor or a brushless direct current motor for example. Motor 18 may be of a same type as, or may include elements of, the motors described in U.S. Provisional Patent Applications no. U.S. 63/135,466 (Title: Drive unit for electric vehicle) and no. U.S. 63/135,474 (Title: Drive unit with fluid pathways for electric vehicle), which are incorporated herein by reference.

Vehicle 10 may also include one or more brakes 34 (referred hereinafter in the singular) that may be applied or released by an actuation of a suitable brake actuator (e.g., lever) by the operator for example. Brake 34 may be operable as a main brake for the purpose of slowing and stopping vehicle 10 during motion of vehicle 10. Alternatively or in addition, brake 34 may be operable as a parking brake, sometimes called "e-brake" or "emergency brake", of vehicle 10 intended to be used when vehicle 10 is stationary. In various embodiments, such main and parking brake functions may use separate brakes, or may use a common brake 34. For example, brake 34 may be a friction-type brake including a master cylinder operatively connected to a brake calliper that urges bake pads against a brake rotor or disk that is coupled to the powertrain of vehicle 10. In some embodiments, such brake rotor may be secured to and rotatable with drive shaft 26.

Actuation of the brake actuator (e.g. lever) may cause a combination of tractive braking and regenerative braking. In some embodiments, the braking may be implemented as described in U.S. patent application Ser. No. 17/091,712 entitled "Braking system for an off-road vehicle", the entirety of which is incorporated herein by reference. In some embodiments, regenerative braking may be used such that the battery 28 is supplied with electric energy generated by motor 18 operating as a generator when the brake actuator (e.g. lever) is applied, and/or when the operator releases accelerator 30.

In some embodiments, system 12 may include operator key 36 permitting the operation of vehicle 10 when key 36 is received into receptacle 38 of vehicle 10, or when key 36 is in sufficient proximity to vehicle 10 for example. The engagement of key 36 with receptacle 38 or the proximity of key 36 to vehicle 10 may be communicated to controller 32 so that controller 32 may authorize the operation of vehicle 10. Key 36 may be attached to one end of tether 40 (e.g., lanyard). The opposite end of tether 40 may be attached to the vehicle operator's clothing, belt, or (e.g. for watercraft use) personal flotation device during operation of vehicle 10. The use of tether 40 and key 36 may allow system 12 to automatically stop propulsion of vehicle 10 by, for example, shutting down or reducing the output of motor 18 to prevent vehicle runaway in an emergency situation such as where the operator would become separated from vehicle 10 and consequently key 36 would become removed from receptacle 38 for example. In some embodiments, separation of the key 36 from the receptacle 38 may prevent vehicle runaway in an emergency situation by preventing propulsion of vehicle 10 and/or activating (e.g. regenerative) braking of motor 18.

Alternatively or in addition to the use of key 36 and tether 40, the presence of the operator in proximity to vehicle 10 and/or the authorization of the operator to operate vehicle 10 may be established by detecting the presence of a portable electronic device (PED) such as a smartphone that may be carried by the operator. Such PED may be in wireless data communication (e.g., paired via Bluetooth®) with controller 32 to inform controller 32 of the proximity of operator via the PED as a proxy. The use of such PED may also provide the ability to detect the operator becoming separated from vehicle 10 in case of a loss of communication between the PED and controller 32 and/or a decrease in signal strength from the PED perceived by controller 32 for example.

Alternatively or in addition, the operator's authorization to operate vehicle 10 may be provided by way of an authorization code or password that may be manually entered by the operator via operator interface 42 permitting the operator to interact with and provide inputs to vehicle 10.

Operator interface 42 may include instrument panel 44 and one or more operator input devices permitting the operator to input commands or other data into vehicle 10. Operator interface 42 may include one or more widgets for manipulation by the operator. Such widgets may, for example, include rotary switches, toggle switches, push buttons, knobs, dials, etc. The widgets may include one or more physical (hard) devices and/or one or more graphical objects on a graphical operator interface provided on a display screen of instrument panel 44 for example.

In various embodiments, instrument panel 44 may include a liquid crystal display (LCD) screen, thin-film-transistor (TFT) LCD screen, light-emitting diode (LED) or other suitable display device operatively connected to controller 32. In some embodiments, instrument panel 44 may be touch-sensitive to facilitate operator inputs. In some embodiments, instrument panel 44 may be capable of producing images in color or monochrome. Instrument panel 44 may be capable of displaying a speedometer and other instrumentation in the form of one or more digital readouts and/or analog gauges. As explained further below, instrument panel 44 may be capable of being controlled by controller 32 to provide an illumination of the instrumentation and/or other information using different illumination colors that may be selected according to the state of vehicle 10. The use of different illumination colors may promote enhanced operator awareness of the state of vehicle 10 during the activation and operation of vehicle 10 for example.

Operator interface 42 of vehicle 10 may include (e.g., emergency) shutoff switch 46, sometimes referred to as a "kill switch", operatively connected to controller 32. Shutoff switch 46 may be disposed on or close to handlebar 24 or at another suitable location that is readily accessible by the operator when the operator is in the normal driving position. The actuation of shutoff switch 46 by the operator may also provide the capability of automatically stopping propulsion of vehicle 10 when vehicle 10 is in motion to prevent vehicle runaway when an emergency situation is perceived by the operator.

Operator interface 42 of vehicle 10 may include start button 48 (e.g., a physical push button) or other input device(s) (e.g., rotary switch(es), multiple push buttons, receptacle 38 and key 36) suitable for activating vehicle 10. In embodiments using start button 48, successive pressing/actuations of start button 48 may successively change the state of vehicle 10 as explained below. Start button 48 may be disposed on or close to handlebar 24 or at another suitable location that is readily accessible by the operator. In some embodiments, start button 48 may be disposed at a location other than on handlebar 24 such as on a body panel or on instrument panel 44 of vehicle 10 for example. Start button 48 may be disposed behind or forward of handlebar 24 for example. In embodiments using a rotary switch (and optionally a key) to activate vehicle 10, such rotary switch may include different angular positions corresponding to the different states of vehicle 10 described herein.

Figure 2:
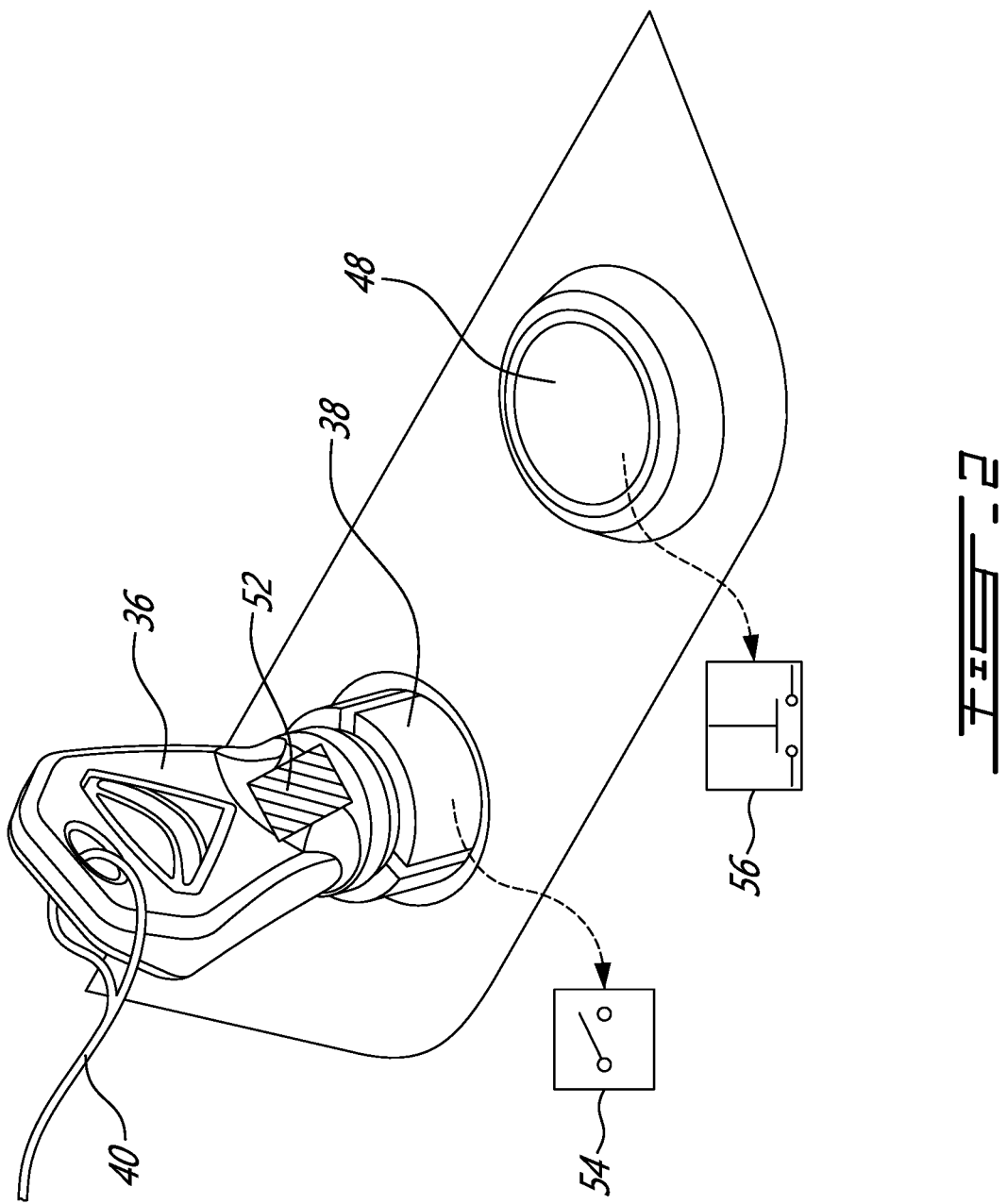
FIG. 2 shows an exemplary key and start button associated with the electric vehicle of FIG. 1.

FIG. 2 shows an exemplary representation of key 36 and of start button 48 associated with vehicle 10. During operation of vehicle 10, key 36 may be tethered to the operator via tether 40. In some embodiments, key 36 may be part of a radio-frequency identification (RFID) system of vehicle 10. Key 36 may include RFID tag 52 which may store data identifying key 36 or a specific operator associated with key 36. When triggered by an electromagnetic interrogation pulse from a RFID reader device associated with vehicle 10 and operatively connected to controller 32, RFID tag 52 may wirelessly transmit the data stored on RFID tag 52 and the data may be used by controller 32 to authenticate key 36 and either permit or prevent the operation of vehicle 10 based on the data. The use of key 36 as part of a RFID system of vehicle 10, the use of a PED in communication with controller 32, and/or the use of a code or password entered by the operator may allow controller 32 to implement a software-based tether switch 54, shown schematically in FIG. 2, that may be used to signal the operator's authorization to use vehicle 10.

In some embodiments, tether switch 54 may be a physical/mechanical hardware-based switch that physically interacts with key 36. For example, tether switch 54 may be disposed within receptacle 38 so that the insertion and withdrawal of key 36 into and out of receptacle 38 may cause key 36 to interface with and actuate tether switch 54 and signal to controller 32 the operator's authorization to use vehicle 10 and/or the presence or absence of the operator onboard vehicle 10.

Start button 48 may be disposed in proximity to receptacle 38. Start button 48 may be operatively connected to controller 32 via start switch 56. Start switch 56 may cause electrical power to be delivered to controller 32 to cause controller 32 to start up. An initial press of start button 48 may cause controller 32 to start up and one or more subsequent presses of start button 48 may instruct controller 32 to transition vehicle 10 to one or more different states. In some embodiments, an integrated circuit powered by LV battery 28B and exhibiting relatively low power consumption may be operatively connected to start button 48 and to controller 32 to detect actuations of start button 48 and instruct controller 32 accordingly. Such integrated circuit may have the form of a system basis chip (SBC) that includes suitable embedded functions. Start button 48 may be green or of another color providing relatively high visibility and distinguishing the function of start button 48 from that of shutoff switch 46 or other input device(s). Start button 48 may be relatively easy to actuate while wearing gloves for example.

Figure 3:
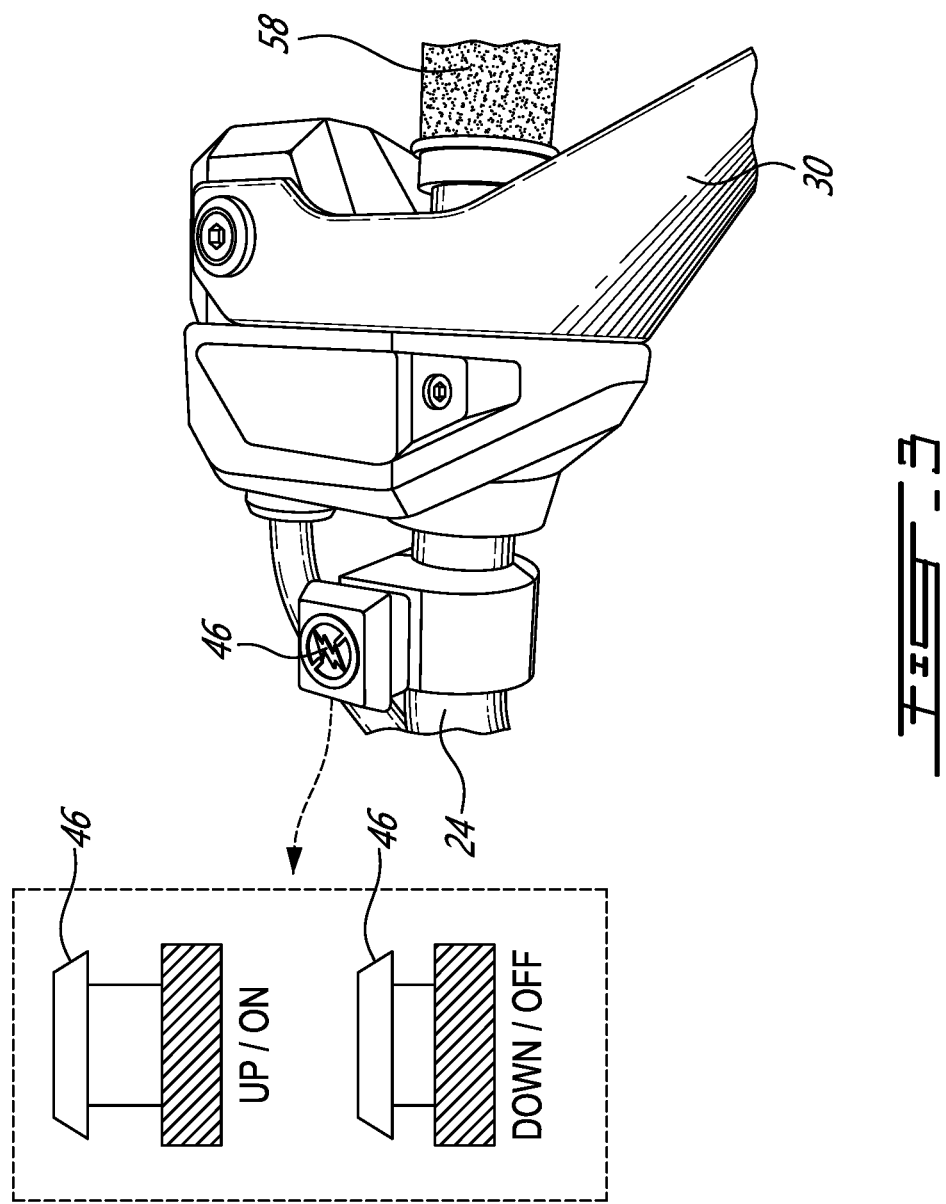
FIG. 3 shows an exemplary emergency shutoff switch associated with the electric vehicle of FIG. 1.

FIG. 3 shows an exemplary representation of shutoff switch 46 associated with vehicle 10. Shutoff switch 46 may be mounted to handlebar 24 in proximity to accelerator 30 and hand grip 58 so that a (e.g., right) hand of the operator used to actuate accelerator 30 may also be used to actuate shutoff switch 46. Shutoff switch 46 may include a physical push button, rotary knob or toggle switch that may actuated between two positions such as vehicle-ON and vehicle-OFF shown in the inset of FIG. 3. Actuating shutoff switch 46 from the vehicle-ON (e.g., up) position to the vehicle-OFF (e.g., down) position when vehicle 10 is in motion may be used to signal to controller 32 that propulsion of vehicle 10 is to be stopped. Shutoff switch 46 may signal to controller 32 that propulsion of vehicle 10 is to be prevented when shutoff switch 46 is in the vehicle-OFF configuration. Shutoff switch 46 may signal to controller 32 that propulsion of vehicle 10 may be permitted when shutoff switch 46 is in the vehicle-ON configuration. Shutoff switch 46 may be configured to remain in its ON or OFF positions without requiring continuous contact from the operator's hand. Shutoff switch 46 may be red, orange or other color providing relatively high visibility.

Figure 4:
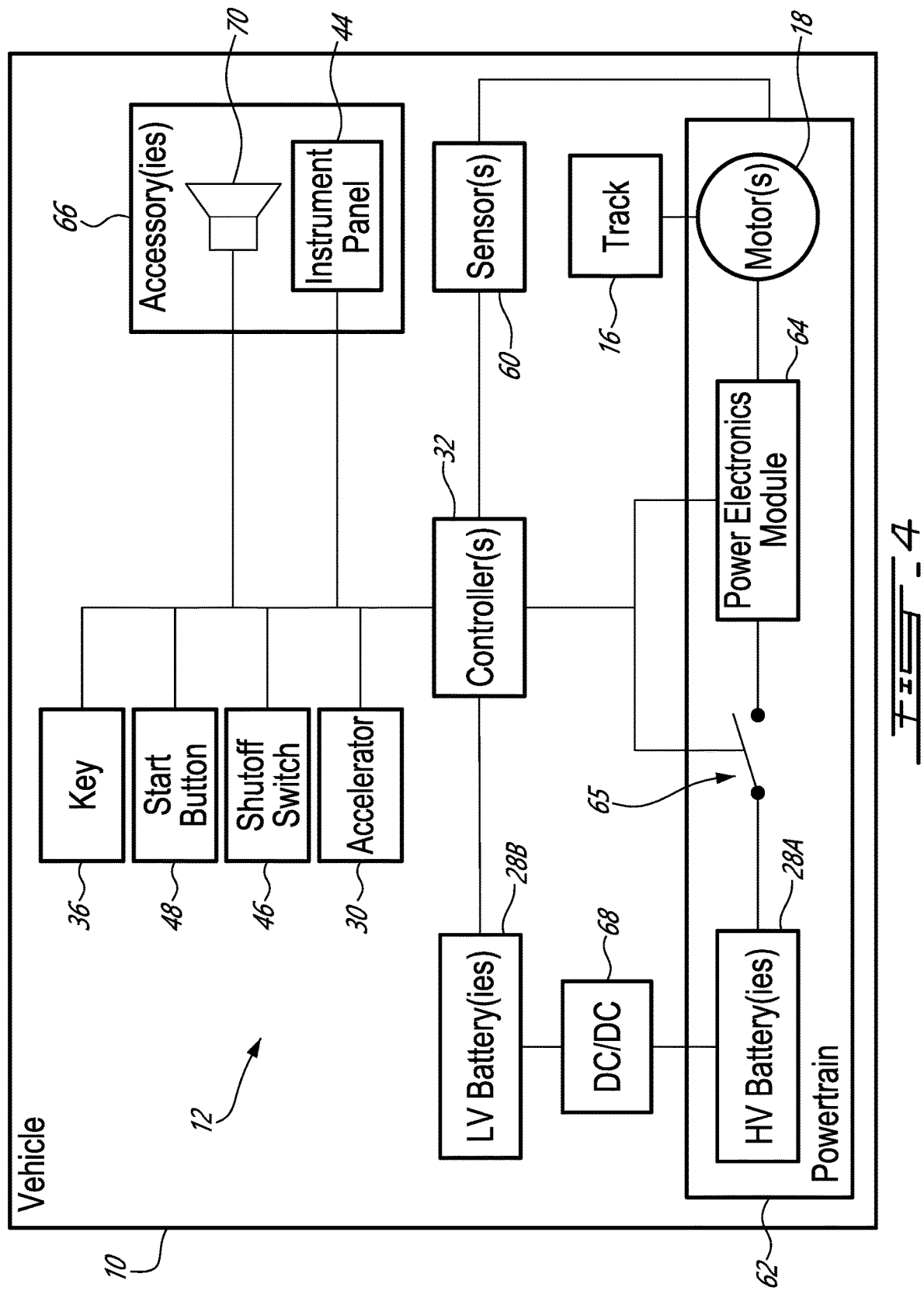
FIG. 4 is a schematic representation of the electric vehicle of FIG. 1 including the vehicle activation system.

FIG. 4 is a schematic representation of vehicle 10 including vehicle activation system 12. System 12 may include one or more sensors 60 operatively connected to component(s) of powertrain 62 of electric vehicle 10 and also to controller 32. Powertrain 62 may include one or more high-voltage (HV) batteries 28A (referred hereinafter in the singular), power electronics module 64 and motor 18. Sensor(s) 60 may be configured to sense one or more operating parameters of powertrain 62 for use by controller 32 for regulating the operation of motor 18 and/or controlling other aspects of vehicle 10. HV battery 28A may be electrically connected or electrically disconnected from PEM 64 using one or more switches 65 (e.g., contactor(s)) controllable via controller 32. Key 36, start button 48, shutoff switch 46 and accelerator 30 may be operatively connected to controller 32.

The operation of motor 18 and the delivery of electric power to motor 18 may be controlled by controller 32 via a suitable power electronics module 64 (referred hereinafter as "PEM 64") including electronic switches (e.g., insulated gate bipolar transistor(s)) to provide motor 18 with electric power having the desired voltage, current, waveform, etc. to implement the desired performance of vehicle 10 based on an actuation of accelerator 30 by the operator indicating a command to propel vehicle 10. PEM 64 may include an assembly containing power components such as power semiconductor devices interconnected to perform a power conversion function. In some embodiments, power electronics module 64 may include a power inverter for example. HV battery 28A may include a lithium ion or other type of battery. In some embodiments, HV battery 28A may be configured to output electric power at a voltage of about 300 volts.

Sensor(s) 60 may include one or more current sensors and/or one or more voltage sensors operatively connected to HV battery 28A and/or connected to PEM 64. Sensor(s) 60 may include one or more position sensors (e.g., rotary encoder) and/or speed sensors (e.g., tachometer) suitable for measuring the angular position and/or angular speed of a rotor of motor 18 and/or of another rotating component of powertrain 62. Sensor(s) 60 may include one or more torque sensors (e.g., a rotary torque transducer) for measuring an output torque of motor 18. Alternatively, the output torque of motor 18 may be inferred based on the amount of electric power (e.g., current) being supplied to motor 18 for example.

Controller 32, may be configured to, using PEM 64 and sensor(s) 60, control motor 18 to propel vehicle 10 based on commands received via accelerator 30. Controller 32 may also be configured to control motor 18 during (e.g., regenerative) braking when motor 18 is back-driven due to motion of vehicle 10 and is operated as a generator. During regenerative braking, electrical power generated by motor 18 may be returned to the supply line for charging HV battery 28A.

Vehicle 10 may include one or more low-voltage (LV) batteries 28B (referred hereinafter in the singular) to supply electric power to controller 32 and optionally other low-voltage devices such as accessories 66. In some embodiments, LV battery 28B may include one or more lead-acid batteries. In some embodiments, LV battery 28B may be configured to output electric power at a voltage of about 12 volts. LV battery 28B may electrically connectable to controller 32 either directly or via a suitable DC/DC converter 68. Low-voltage accessories 66 may include speaker 70 and instrument panel 44 for example. LV battery 28B may be chargeable using electric power from HV battery 28A at a voltage that is reduced using DC/DC converter 68.

Figure 5:
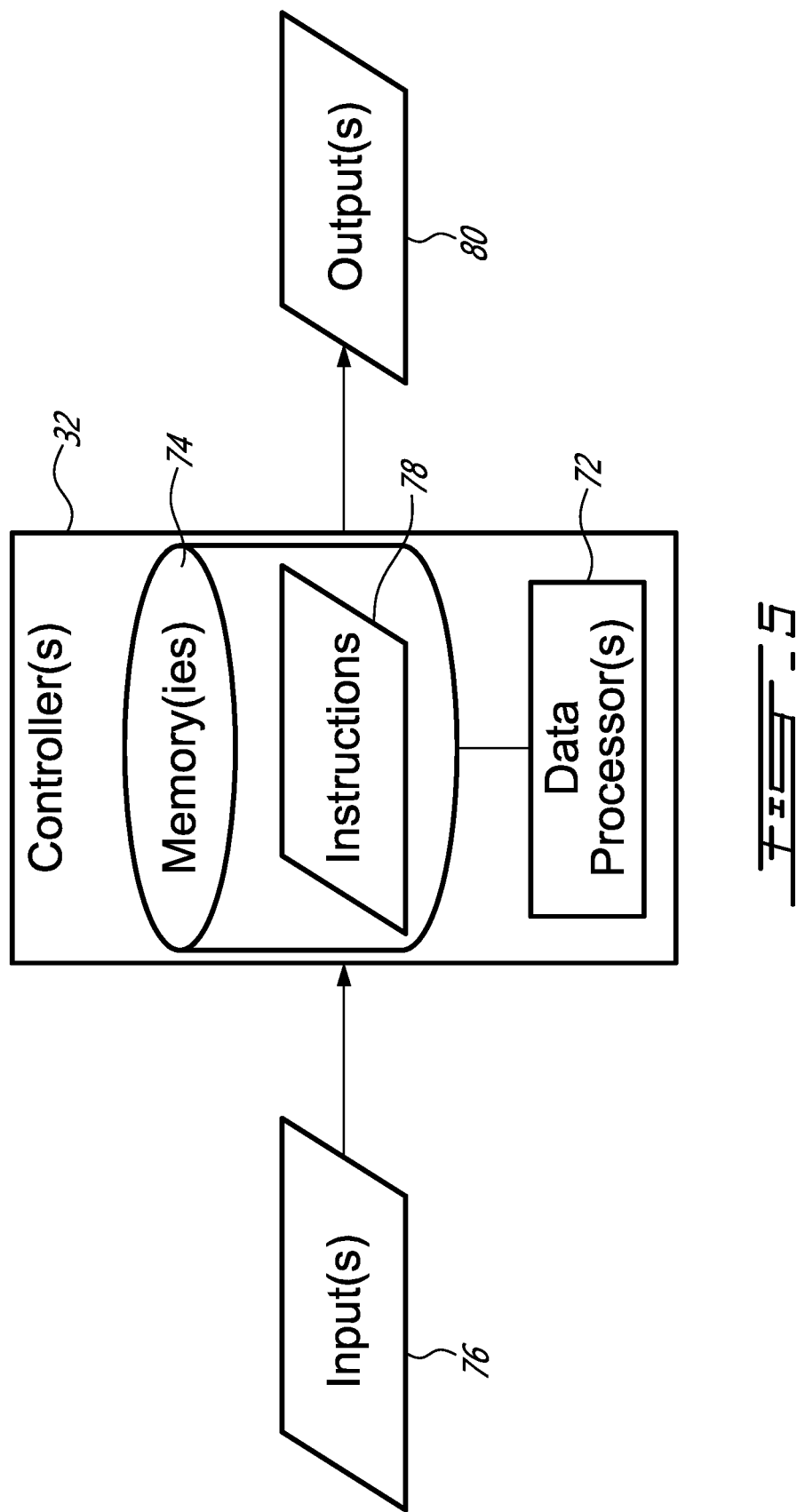
FIG. 5 is a schematic representation of a controller of the vehicle activation system of FIG. 4.

FIG. 5 is a schematic representation of controller 32 of vehicle activation system 12. Controller 32 may include one or more data processors 72 (referred hereinafter as "processor 72") and non-transitory machine-readable memory 74. Controller 32 may be configured to regulate the operation of motor 18 via PEM 64, and optionally also control other aspects of operation of vehicle 10. Controller 32 may receive input(s) 76, perform one or more procedures or steps defined by instructions 78 stored in memory 74 and executable by processor 72 to generate output(s) 80. Controller 32 may include multiple controllers including a vehicle controller, a battery controller (e.g., battery management system), and a motor controller for example.

Controller 32 may carry out additional functions than those described herein. Processor 72 may include any suitable device(s) configured to cause a series of steps to be performed by controller 32 so as to implement a computer-implemented process such that instructions 78, when executed by controller 32 or other programmable apparatus, may cause the functions/acts specified in the methods described herein to be executed. Processor 72 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 74 may include any suitable machine-readable storage medium. Memory 74 may include non-transitory computer readable storage medium such as, for example, but not limited to, an electronic, magnetic, optical, electromagnetic, infrared, or semiconductor system, apparatus, or device, or any suitable combination of the foregoing. Memory 74 may include a suitable combination of any type of machine-readable memory that is located either internally or externally to controller 32. Memory 74 may include any storage means (e.g. devices) suitable for retrievably storing machine-readable instructions 78 executable by processor 72.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 74) having computer readable program code (e.g., instructions 78) embodied thereon. Computer program code for carrying out operations for aspects of the present disclosure in accordance with instructions 78 may be written in any combination of one or more programming languages. Such program code may be executed entirely or in part by controller 32 or other data processing device(s). It is understood that, based on the present disclosure, one skilled in the relevant arts could readily write computer program code for implementing the methods described and illustrated herein.

Figure 6:
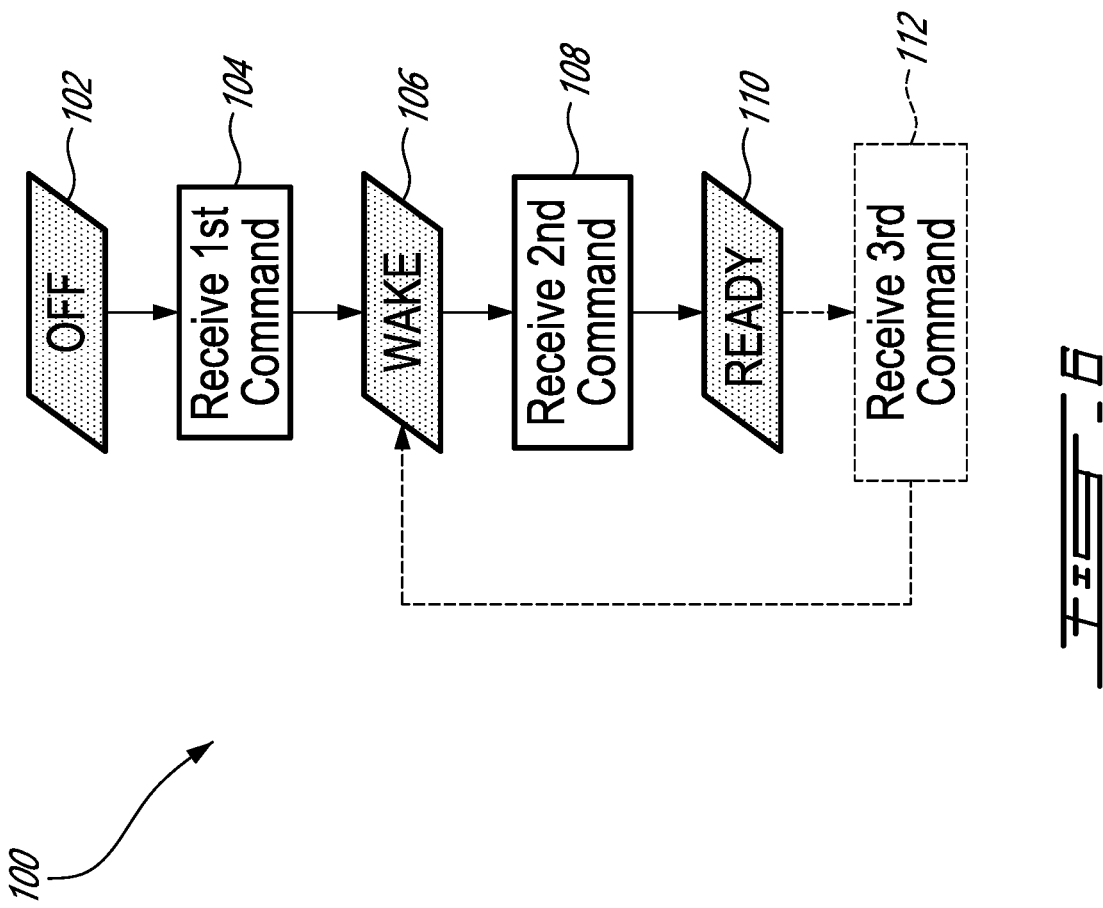
FIG. 6 shows a flow diagram of an exemplary method of activating an electric vehicle.

FIG. 6 shows a flow diagram of an exemplary method 100 of activating vehicle 10, or another electric (e.g., power-sport) vehicle. Machine-readable instructions 78 may be configured to cause controller 32 to perform at least part of method 100. Aspects of method 100 may be combined with other actions or aspects of other methods described herein. Aspects of vehicles described herein may also be incorporated into method 100.

The activation or start-up of vehicle 10 may include transitioning vehicle 10 from an inactive (i.e., OFF) state to an intermediate partially active (i.e., WAKE) state, and then to a fully active (i.e., READY) state. Method 100 may make use of a two-input-command approach for transitioning vehicle 10 from the inactive state to the ready state where vehicle 10 may be propelled. In various embodiments, the two commands may be received via a common operator input device such as start button 48. Alternatively, the two commands may be received via different operator input devices.

In various embodiments, method 100 may include:
when vehicle 10 is in the OFF state (block 102), a first command to activate vehicle 10 may be received (block 104);
in response to the first command, vehicle 10 may be transitioned from the OFF state to the WAKE state (block 106);
after receiving the first command, a second command to activate vehicle 10 may be received (block 108); and
in response to the second command, vehicle 10 may be transitioned from the WAKE state to the READY state (block 110).

In some embodiments, method 100 may optionally include, after receiving the second command, receiving a third command to activate vehicle 10 (block 112). In response to the third command, vehicle 10 may be transitioned from the READY state to the WAKE state at block 106. The operator of vehicle 10 may send the third command during a brief pause after having driven vehicle 10.

In the OFF sate, vehicle 10 may be in a partially or fully inactive state where some or all of controller(s) 32, accessories 66 and instrument panel 44 may be off. In some embodiments, electric power may not be supplied to controller 32, to accessories 66 and/or to instrument panel 44 when vehicle 10 is in the OFF state. Similarly, switch 65 may be open so that HV battery 28A is electrically disconnected from PEM 64 so that vehicle 10 may not be propelled via motor 18 when vehicle 10 is in the OFF state. Vehicle 10 may be placed in the OFF state in preparation for a period of inactivity of vehicle 10 and/or when vehicle 10 is to be left unattended for example.

The receipt of the first command (e.g., via start button 48) at block 104 may, for example, establish an electric connection between LV battery 28B and controller 32 so that controller 32 may be powered-up and activated. Once controller 32 has been activated, controller 32 may be responsive to subsequent actuations of start button 48 in order to transition vehicle 10 to the desired state.

During the WAKE state, one or more preparatory tasks may be carried out in preparation for the driving of vehicle 10 but propulsion of vehicle 10 via motor 18 may be prevented. In other words, propulsion commands received via accelerator 30 (i.e., accelerator commands) may be ignored by controller 32 when vehicle 10 is in the WAKE state. As explained below, a visual or other type of indication may be provided to the operator (e.g., via instrument panel 44) to indicate the WAKE state of vehicle 10. In the WAKE state, some operator interaction with vehicle 10 may be permitted via operator interface 42. For example, an operator may interact with operator interface 42 to select an operation mode (e.g., eco, normal, sport) for vehicle 10 or adjust other vehicle settings.

The receipt of the second command, as a subsequent actuation of start button 48 for example, may cause vehicle 10 to transition from the WAKE state to the READY state where vehicle 10 may be driven. In the READY state, propulsion of vehicle 10 via motor 18 may be permitted and propulsion commands received via accelerator 30 (i.e., accelerator commands) may be executed by controller 32. As explained below, a visual or other type of indication may be provided to the operator (e.g., via instrument panel 44) to indicate the READY state of vehicle 10.

In some embodiments of method 100, the transition of vehicle 10 from the OFF state to the WAKE state may not require an operator's authorization to operate vehicle 10 being received via key 36 or otherwise. However, in some embodiments of method 100, the transition of vehicle 10 from the OFF state to the WAKE state may be conditioned upon the operator's authorization to operate vehicle 10 having been received. Similarly, in some embodiments of method 100, the transition of vehicle 10 from the WAKE state to the READY state may be conditioned upon the operator's authorization to operate vehicle 10 having been received. Still further, in some embodiments of method 100, the transition of vehicle 10 from the WAKE state to the READY state may be conditioned upon shutoff switch 46 being in a vehicle-ON (e.g., up) position. Still further, in some embodiments of method 100, the transition of vehicle 10 from the WAKE state to the READY state may be conditioned upon the accelerator 30 being in an un-activated position (e.g. such that is does not issue an accelerator command).

In some embodiments of method 100 and other methods described herein, the transition of vehicle 10 from the WAKE state to the OFF state may occur automatically if vehicle 10 is left in either the WAKE state or the READY state without interaction for a time period that exceeds a prescribed threshold for example. In some embodiments, vehicle 10 may be transitioned to the OFF state manually by a relatively longer (e.g., a few seconds) press of start button 48 for example. In other words, vehicle 10 may be transitioned to the OFF state manually by pressing of start button 48 for a period of time that exceeds a prescribed threshold.

Figure 7:
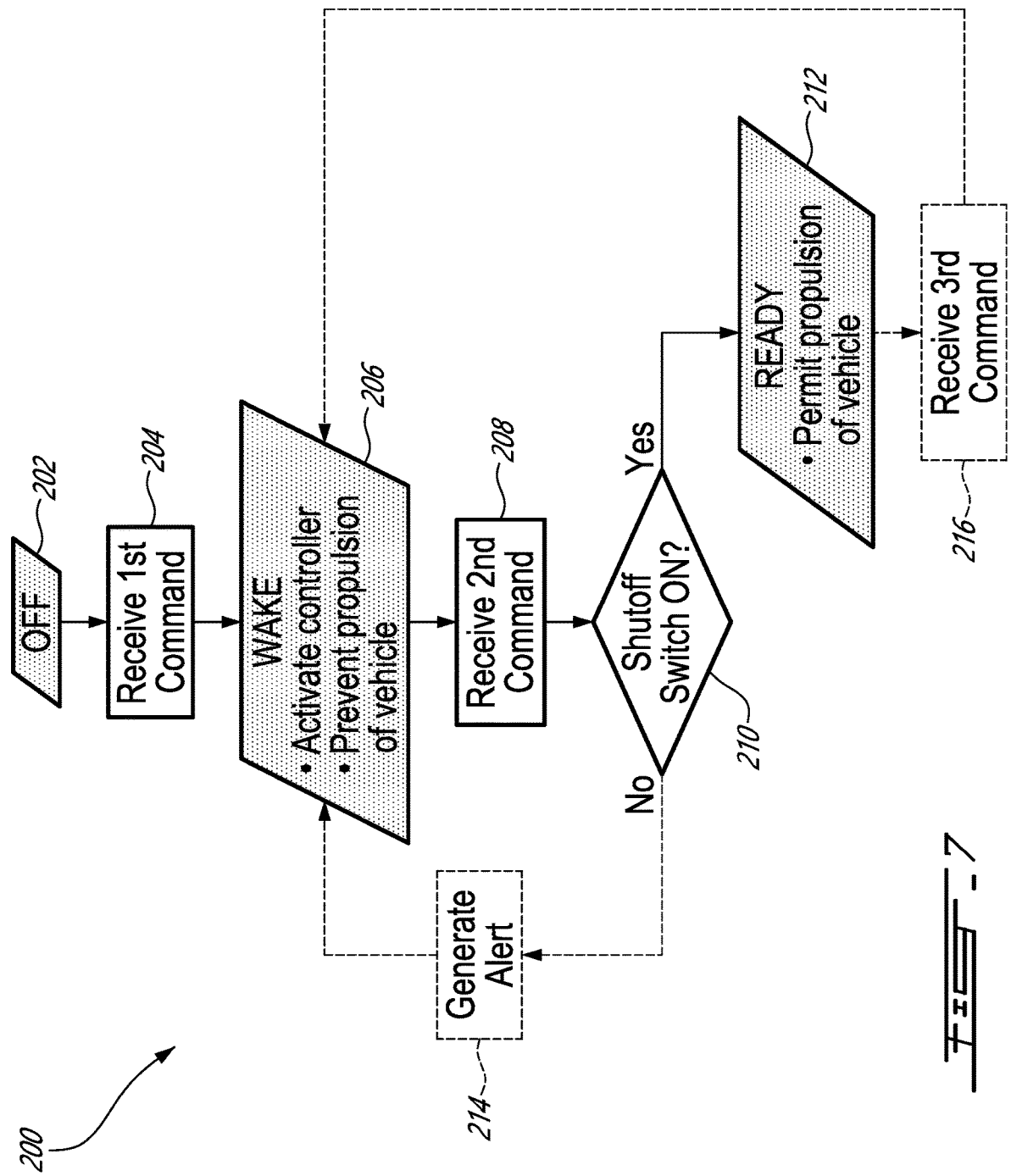
FIG. 7 shows a flow diagram of another exemplary method of activating an electric vehicle.

FIG. 7 shows a flow diagram of another exemplary method 200 of activating vehicle 10, or another electric (e.g., powersport) vehicle. Machine-readable instructions 78 may be configured to cause controller 32 to perform at least part of method 200. Aspects of method 200 may be combined with other actions or aspects of other methods described herein. Aspects of vehicles described herein may also be incorporated into method 200. In various embodiments, method 200 may include:

when vehicle 10 is in the OFF state (block 202), a first command to activate vehicle 10 may be received via an operator input device disposed on vehicle 10 (block 204);
  in response to the first command, vehicle 10 may be transitioned from the OFF state to the WAKE state where controller 32 of vehicle 10 is activated and vehicle 10 is prevented from being propelled by motor 18 (block 206);
  after receiving the first command, a second command to activate vehicle 10 may be received via the operator input device (block 208) when shutoff switch 46 is in the vehicle-on configuration (block 210); and
  in response to the second command, vehicle 10 may be transitioned from the WAKE state to the READY state where vehicle 10 is permitted to be propelled by motor 18 (block 212).

In some embodiments, the first and second commands may both be received via start button 48. In a situation where shutoff switch 46 would be in the vehicle-OFF configuration when the second command is received, the transition of vehicle 10 to the READY state may not be permitted by controller 32. In such scenario encountered at decision block 210, no action may be taken or a suitable alert may be generated at block 214 to alert the operator to put shutoff switch 46 in the vehicle-ON configuration before sending the second command by pressing start button 48 again for example. In some embodiments, such alert may include an audible indication (e.g., beep) generated using speaker 70 for example. Alternatively or in addition, the alert may include a visual and/or or a haptic indication provided for the operator.

In some embodiments of method 200, after receiving the second command and when vehicle 10 is in the READY state, a third command may be received from the operator input device (e.g., as a subsequent actuation of start button 48) at block 216. In response to the third command, vehicle 10 may be transitioned from the READY state to the WAKE state at block 206.

FIG. 8 shows a flow diagram of another exemplary method 300 of activating vehicle 10, or another electric (e.g., powersport) vehicle. Machine-readable instructions 78 may be configured to cause controller 32 to perform at least part of method 300. Aspects of method 300 may be combined with other actions or aspects of other methods described herein. Aspects of vehicles described herein may also be incorporated into method 300. In various embodiments, method 300 may include:

when vehicle 10 is in the OFF state (block 302), a first command to activate vehicle 10 may be received (block 304);
  in response to the first command, vehicle 10 may be transitioned from the OFF state to the WAKE state (block 306) where:
  controller 32 may be activated;
  vehicle 10 may be prevented from being propelled by motor 18; and
  regenerative (or other form of) braking of motor 18 may be caused when vehicle 10 is in motion causing back-driving of motor 18;
  after receiving the first command, a second command to activate vehicle 10 may be received (block 308); and
  in response to the second command, vehicle 10 may be transitioned from the WAKE state to the READY state where vehicle 10 may be permitted to be propelled by motor 18 (block 310).

In some embodiments, the first and second commands may both be received via start button 48.

In the WAKE state, a regenerative braking function of vehicle 10 may be enabled (armed) so as to be ready to be used if needed. For example, in the event where vehicle 10 is parked on a hill while in the WAKE state, motion of vehicle 10 down the hill due to gravity could potentially cause back-driving of motor 18 and hence cause motor 18 to operate as a generator. Controller 32 may then cause regenerative or other form of braking of motor 18. Such regenerative braking may then cause a load (torque) to be applied to motor 18 and provide some resistance hindering the movement of vehicle 10. Such regenerative braking may, in some situations, prevent vehicle 10 from unintentionally speeding down the hill in case of friction brake 34 not being engaged when vehicle 10 is parked for example.

In some embodiments of method 300, after receiving the second command and when vehicle 10 is in the READY state, a third command may be received from the operator input device (e.g., as a subsequent actuation/press of start button 48) at block 312. In response to the third command, vehicle 10 may be transitioned from the READY state to the WAKE state at block 306.

FIG. 9 shows a flow diagram of another exemplary method 400 of activating vehicle 10, or another electric (e.g., powersport) vehicle. Machine-readable instructions 78 may be configured to cause controller 32 to perform at least part of method 400. Aspects of method 400 may be combined with other actions or aspects of other methods described herein. Aspects of vehicles described herein may also be incorporated into method 400. Method 400 is described in reference to FIGS. 10A and 10B. In various embodiments, method 400 may include:

when vehicle 10 is in the OFF state (block 402), a first command to activate vehicle 10 may be received via an operator input device disposed on vehicle 10 (block 404);

in response to the first command, vehicle 10 may be transitioned from the OFF inactive state to the WAKE state (block 406) where:

controller 32 of vehicle 10 may be activated;

capacitor 82 (shown in FIGS. 10A and 10B) of PEM 64 operatively disposed between HV battery 28A and motor 18 may be charged; and vehicle 10 may be prevented from being propelled by motor 18;

after receiving the first command, a second command to activate vehicle 10 may be received via the operator input device (block 408); and in response to the second command, vehicle 10 may be transitioned from the WAKE state to the READY state where vehicle 10 may be permitted to be propelled by motor 18 (block 410).

In some embodiments, the first and second commands may both be received via start button 48.

FIGS. 10A and 10B show different configurations of an exemplary circuit 83 for activating vehicle 10. PEM 64 may be operatively connected between HV battery 28A and motor 18 to control the delivery of electric power from HV battery 28A to motor 18. Motor 18 may be a polyphase (e.g., 3-phase) synchronous motor and may include a plurality of armature (e.g., stator) windings such as armature windings L1, L2, L3. Armature windings L1, L2, L3 may be connected in a wye or delta configuration. Neutral point N may be connected to ground G.

PEM 64 may include inverter 84 and capacitor 82 may be electrically connected in parallel with inverter 84. Capacitor 82 may be a smoothing capacitor within PEM 64. Circuit 83 may also include fuse 86 operative to provide overcurrent protection for circuit 83.

The electric connection of HV battery 28A to PEM 64 when vehicle 10 is transitioned from the OFF state to the WAKE state may be done using a suitable inrush current limiting device such as positive temperature coefficient (PTC) thermistor 88 for example. The current limiting device may prevent excessive inrush current from HV battery 28A when HV battery 28A is electrically connected to PEM 64 and capacitor 82 is charged.

When transitioning vehicle 10 from the OFF state to the WAKE state, HV battery 28A may be initially connected to PEM 64 by closing of switches 65A and 65B as shown in FIG. 10A. Such connection may connect PTC thermistor 88 in series with PEM 64 and with capacitor 82 and thereby limit inrush current from HV battery 28A as capacitor 82 is charged. In some embodiments, the charging of capacitor 82 may take about 1-2 seconds for example. After such time period, switch 65C may be closed as shown in FIG. 10B to provide an electric connection to PEM 64 that bypasses PTC thermistor 88 in preparation for propulsion of vehicle 10 via PEM 64.

In preparation for propulsion of vehicle 10, switch 65A may be opened while switches 65B and 65C are closed. Switches 65A-65C may be operatively connected to be controlled via controller 32. Components of circuit 83 such as PTC thermistor 88 and one or more of switches 65A-65C may be disposed on a circuit board that is part of the battery management system (BMS) of vehicle 10. In some embodiments, switch 65A may be disposed on a circuit board that is part of the battery management system (BMS) and switches 65B, 65C may be high power relays mounted to a frame or structure of a battery pack.

The configuration of circuit 83 shown in FIG. 10B may be adopted in the WAKE state of vehicle 10 in preparation for the transition to the READY state. In other words, the transition from the OFF state to the WAKE state may cause switches 65B and 65C to be closed so that HV battery 28A may be electrically connected to inverter 84 of PEM 64. Even though HV battery 28A may be electrically connected to PEM 64, the propulsion of vehicle 10 may be prevented by preventing electric power from being delivered to motor 18 via inverter 84. Preventing propulsion of vehicle 10 while in the WAKE stage may be done by controller 32 not executing (e.g., ignoring) propulsion commands that may be received via accelerator 30 when vehicle 10 is in the WAKE state. Ignoring propulsion commands may include controller 32 keeping the switches of inverter 84 in a configuration where electric power is not supplied to motor 18. In other words, while in the WAKE state, controller 32 may be programmed not to control inverter 84 according to propulsion commands that may be received via accelerator 30.

In reference to FIG. 9 again, in some embodiments of method 400, after receiving the second command and when vehicle 10 is in the READY state, a third command may be received from the operator input device (e.g., as a subsequent actuation of start button 48) at block 412. In response to the third command, vehicle 10 may be transitioned from the READY state to the WAKE state at block 406.

In some embodiments, repeated transitioning between the WAKE state and the READY state by pressing start button 48 for example may cause HV battery 28A to remain electrically connected to PEM 64 and capacitor 82 to remain charged. Accordingly, the configuration of circuit 83 shown in FIG. 10B may be retained during transitions between the WAKE and READY states. This may avoid repeated opening and closing of switches 65A-65B during such transitions and may consequently suppress the degradation of switches 65A-65B due to frequent switching.

FIG. 11 shows a flow diagram of another exemplary method 500 of activating vehicle 10, or another electric (e.g., powersport) vehicle. Machine-readable instructions 78 may be configured to cause controller 32 to perform at least part of method 500. Aspects of method 500 may be combined with other actions or aspects of other methods described herein. Aspects of vehicles described herein may also be incorporated into method 500. Method 500 is described in reference to FIGS. 12A-12C. In various embodiments, method 500 may include:

when vehicle 10 is in the OFF state (block 502), a first command to activate vehicle 10 may be received (block 504);

in response to the first command, vehicle 10 may be transitioned from the OFF state to the WAKE state (block 506) where:

controller 32 of vehicle 10 is activated;

vehicle 10 is prevented from being propelled by motor 18; and first visual indication 90A (e.g. of a first color, texture or pattern) may be provided to indicate the WAKE state of vehicle 10;

after receiving the first command, a second command to activate vehicle 10 may be received (block 508); and in response to the second command, vehicle 10 may be transitioned from the WAKE state to the READY state (block 510) where:

vehicle 10 is permitted to be propelled by motor 18; and second visual indication 90B (e.g. of a second color, texture or pattern) different from the first color, texture or pattern may be provided to indicate the READY state of vehicle 10.

In some embodiments, the first and second commands may both be received via start button 48.

Figure 12A:
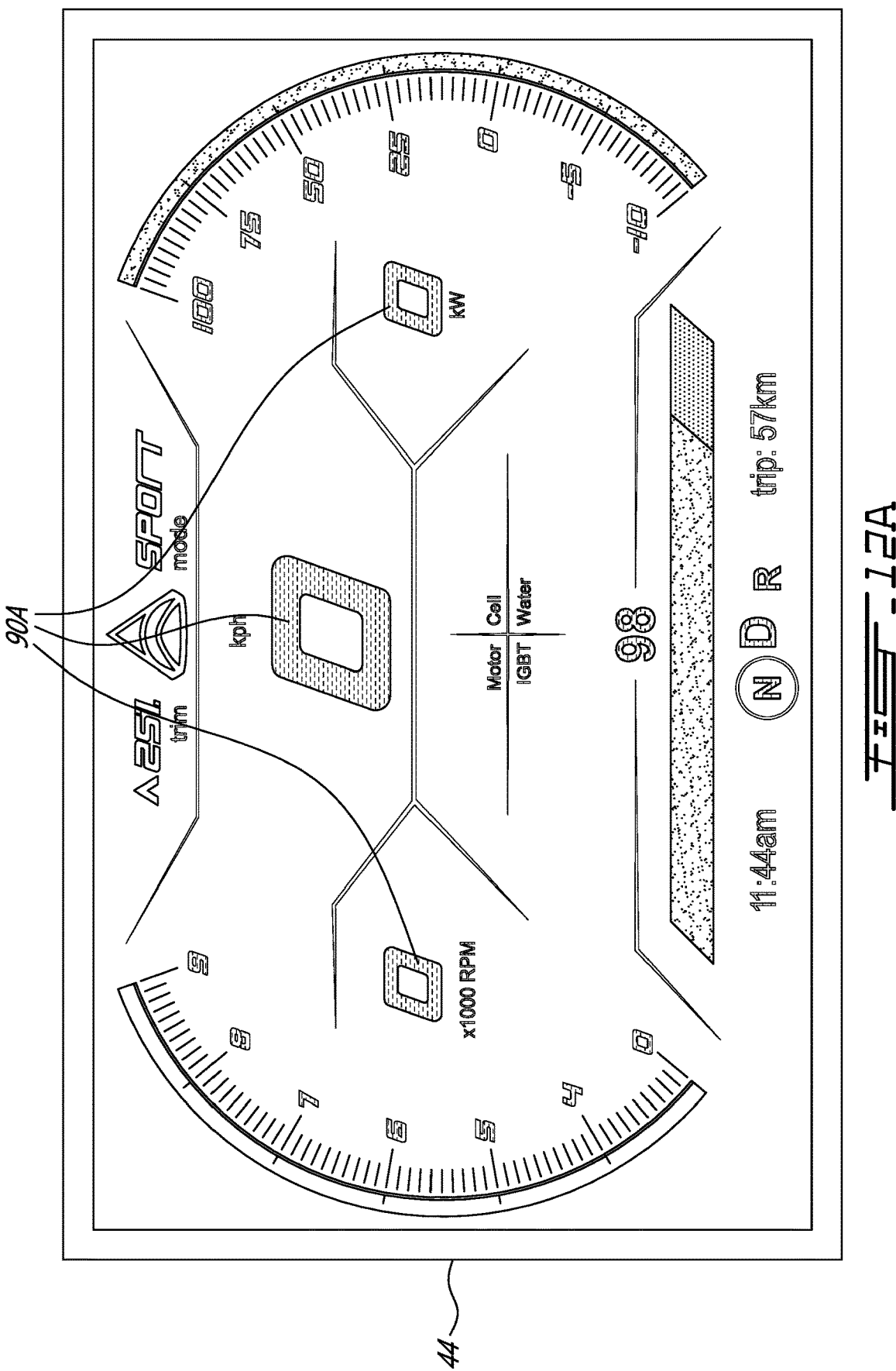
Figure 12B:
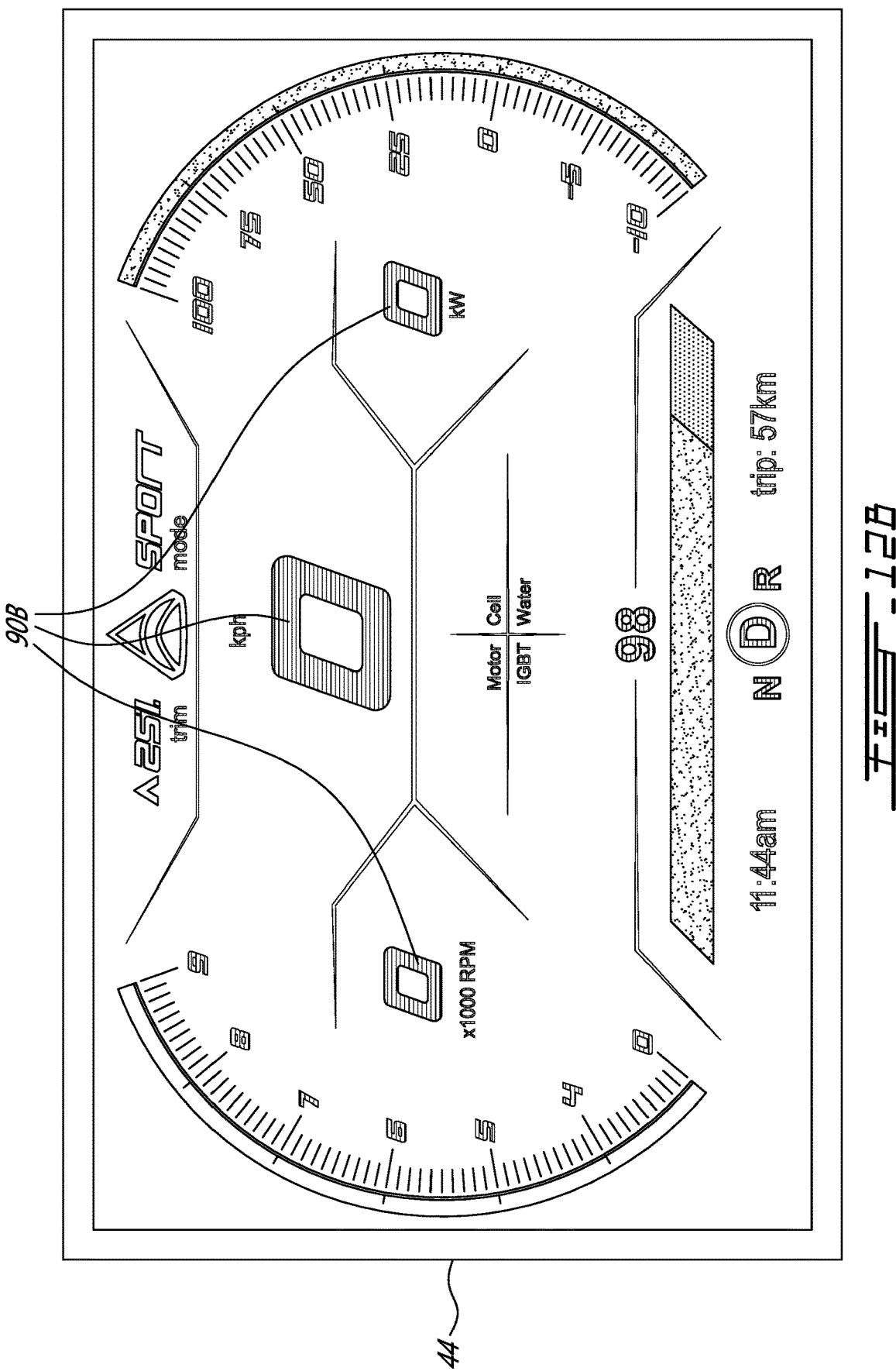

FIGS. 12A-12C show exemplary graphic representations displayed on instrument panel 44 of vehicle 10. Visual indications 90A-90C may be provided on instrument panel 44 and/or at another location on vehicle 10 that is readily visible by operator so as to promote the operator's awareness of the state of vehicle 10. In some embodiments, visual indications 90A-90C may be provided by a single variable-color indicator light (e.g., variable color LED), or by multiple indicator lights of different colors for example. In some embodiments, visual indications 90A-90C may include one or more textual and/or graphic indications indicative of the state of vehicle 10 for example. In some embodiments as shown in FIGS. 12A-12C, visual indications 90A-90C may be provided by way of different background and/or foreground illumination colors of instrument panel 44.

FIG. 12A shows an exemplary graphic representation displayed on instrument panel 44 of vehicle 10 when vehicle 10 is in the WAKE state and in a neutral mode of operation as indicated by the letter "N" being circled at the bottom of instrument panel 44. When vehicle 10 is transitioned from the OFF state to the WAKE state, instrument panel 44 may be transitioned from being unlit to being lit, with at least some of the instrument panel 44 being shown in a first illumination color (e.g., gray) that is indicative of the WAKE state. In the example of FIG. 12A, some or all of the textual and/or graphic indications or a background of instrument panel 44 may be shown in the first illumination color to provide first visual indication 90A.

FIG. 12B shows an exemplary graphic representation displayed on instrument panel 44 of vehicle 10 when vehicle 10 is in the READY state and in a forward (drive) mode of operation as indicated by the letter "D" being circled at the bottom of instrument panel 44. When vehicle 10 is transitioned from the WAKE state to the READY state, at least some of the instrument panel 44 may be transitioned from having the first illumination color (e.g., gray) indicative of the WAKE state to having the second illumination color (e.g., green) indicative of the READY state. In the example of FIG. 12B, some or all of the textual and/or graphic indications or the background may be shown in the second illumination color to provide second visual indication 90B.

In reference to FIG. 11 again, in some embodiments of method 500, after receiving the second command and when vehicle 10 is in the READY state, a third command may be received from the operator input device (e.g., as a subsequent actuation of start button 48) at block 512. In response to the third command, vehicle 10 may be transitioned from the READY state to the WAKE state at block 506.

In some embodiments, repeated transitioning (i.e., toggling) between the WAKE state and the READY state by pressing start button 48 for example may cause corresponding transitioning between the first and second visual indications 90A, 90B being provided in order to reflect the corresponding WAKE or READY states of vehicle 10. In the example shown in FIGS. 12A and 12B, transitioning between the WAKE and READY states may cause the illumination color of instrument panel 44 to be changed accordingly.

FIG. 12C shows an exemplary graphic representation displayed on instrument panel 44 of vehicle 10 when vehicle 10 is in the READY state and in a reverse mode of operation as indicated by the letter "R" being circled at the bottom of instrument panel 44. When vehicle 10 is in the READY state and transitioned between the forward and reverse modes of operation, second visual indication 90B indicative of the READY state may be changed accordingly. FIG. 12C shows third visual indication 90C indicative of vehicle 10 being in the READY state and reverse mode of operation to promote the operator's awareness of the state of vehicle 10. When vehicle 10 is transitioned from the forward mode of operation to the reverse mode of operation, instrument panel 44 may be transitioned from displaying the second illumination color (e.g., green) indicative of the forward mode of operation to displaying a third illumination color (e.g., orange) indicative of the reverse mode of operation. In the example of FIG. 12C, some or all of the textual and/or graphic indications and/or the background may be shown in the third illumination color to provide third visual indication 90C.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

What is claimed is:

1. A method of activating an electric vehicle, the method comprising:
   when the electric vehicle is in an inactive state, receiving a first command to activate the electric vehicle;
   in response to the first command, transitioning the electric vehicle from the inactive state to a wake state where:
     a controller of the electric vehicle is activated;
     the electric vehicle is prevented from being propelled by an electric motor configured to propel the electric vehicle; and
     regenerative braking of the electric motor is caused when the electric vehicle is in motion causing back-driving of the electric motor;
   after receiving the first command, receiving a second command to activate the electric vehicle; and
   in response to the second command, transitioning the electric vehicle from the wake state to a ready state where the electric vehicle is permitted to be propelled by the electric motor.

2. The method as defined in claim 1, comprising, in response to the first command, providing a first visual indication of a first color indicating the wake state of the electric vehicle.

3. The method as defined in claim 2, comprising, in response to the second command, providing a second visual indication of a second color indicating the ready state of the electric vehicle.

4. The method as defined in claim 3, wherein the first and second visual indications include an illumination of an instrument panel of the electric vehicle.

5. The method as defined in claim 3, comprising changing the second color of the second visual indication when transitioning the electric vehicle from a forward mode of operation to a reverse mode of operation.

6. The method as defined in claim 1, wherein transitioning the electric vehicle from the wake state to the ready state is conditioned upon an operator's authorization to operate the electric vehicle having been received.

7. The method as defined in claim 1, comprising:
   after receiving the second command, receiving a third command; and
   in response to the third command, transitioning the electric vehicle from the ready state to the wake state.

8. A vehicle activation system for an electric vehicle, the vehicle activation system comprising:
   an operator interface for receiving a first command and a second command to activate the electric vehicle;
   one or more data processors operatively connected to the operator interface; and
   non-transitory machine-readable memory storing instructions executable by the one or more data processors and configured to cause the one or more data processors to:
      in response to receiving the first command to activate the electric vehicle when the electric vehicle is in an inactive state:
         cause the electric vehicle to be prevented from being propelled by an electric motor configured to propel the electric vehicle; and
         cause regenerative braking of the electric motor when the electric vehicle is in motion causing back-driving of the electric motor; and
      in response to receiving the second command to activate the electric vehicle after receiving the first command, cause the electric vehicle to be permitted to be propelled by the electric motor.

9. The vehicle activation system as defined in claim 8, wherein the instructions are configured to cause the one or more data processors to, in response to the first command, cause a first visual indication of a first color to be provided.

10. The vehicle activation system as defined in claim 9, wherein the instructions are configured to cause the one or more data processors to, in response to the second command, cause a second visual indication of a second color different from the first color to be provided.

11. The vehicle activation system as defined in claim 10, wherein the first and second visual indications include an illumination of an instrument panel of the electric vehicle.

12. The vehicle activation system as defined in claim 10, wherein the instructions are configured to cause the one or more data processors to cause the second color of the second visual indication to be changed when the electric vehicle is transitioned from a forward mode of operation to a reverse mode of operation.

13. The vehicle activation system as defined in claim 8, wherein the second command is configured to cause the electric vehicle to be permitted to be propelled by the electric motor conditioned upon an operator's authorization to operate the electric vehicle being received.

14. The vehicle activation system as defined in claim 8, wherein the instructions are configured to cause the one or more data processors to, in response to receiving a third command via the operator interface after receiving the second command, cause the electric vehicle to be prevented from being propelled by the electric motor.

15. An electric powersport vehicle comprising:
   an electric motor configured to propel the electric powersport vehicle;
   an operator interface for receiving a first command and a second command to activate the electric powersport vehicle; and
   a controller operatively connected to the operator interface, the controller being configured to:
      in response to the first command to activate the electric powersport vehicle being received via the operator interface:
         cause the electric powersport vehicle to be prevented from being propelled by the electric motor; and
         cause regenerative braking of the electric motor when the electric powersport vehicle is in motion causing back-driving of the electric motor; and
      in response to the second command to activate the electric powersport vehicle being received via the operator interface after receiving the first command, cause the electric powersport vehicle to be permitted to be propelled by the electric motor.

16. The electric powersport vehicle as defined in claim 15, comprising a shutoff switch configurable between a vehicle-on configuration and a vehicle-off configuration, wherein the controller is configured to, in response to the second command to activate the electric powersport vehicle being received via the operator interface after receiving the first command and when the shutoff switch is in the vehicle-on configuration, cause the electric powersport vehicle to be permitted to be propelled by the electric motor.

17. The electric powersport vehicle as defined in claim 15, wherein the operator interface includes a push button via which the first and second commands are received.

18. The electric powersport vehicle as defined in claim 15, comprising a battery and a power electronics module, wherein the controller is configured to, in response to the first command, cause the battery to be electrically connected to the power electronics module configured to control a delivery of electric power from the battery to the electric motor.

19. The electric powersport vehicle as defined in claim 18, wherein the controller is configured to, in response to the first command, cause charging of a capacitor of the power electronics module.

20. The electric powersport vehicle as defined in claim 15, wherein the electric powersport vehicle is a snowmobile.

* * * * *